United States Patent
Ainsworth, III et al.

(10) Patent No.: US 9,710,841 B2
(45) Date of Patent: Jul. 18, 2017

(54) METHOD AND MEDIUM FOR RECOMMENDING A PERSONALIZED ENSEMBLE

(71) Applicant: Comenity LLC, Columbus, OH (US)

(72) Inventors: Richard Barber Ainsworth, III, Dublin, OH (US); Christian Billman, Gahanna, OH (US); Ben Elbert, Lancaster, OH (US); Uchenna Chilaka, Gahanna, OH (US); Kyle Leber, Columbus, OH (US); Ramesh Korra, Hilliard, OH (US); Jonathan Maupin, Columbus, OH (US); Diane Meves, Columbus, OH (US)

(73) Assignee: Comenity LLC, Columbus, OH (US)

( * ) Notice: Subject to any disclaimer, the term of this patent is extended or adjusted under 35 U.S.C. 154(b) by 52 days.

(21) Appl. No.: 14/042,478

(22) Filed: Sep. 30, 2013

(65) Prior Publication Data
US 2015/0095184 A1 Apr. 2, 2015

(51) Int. Cl.
G06Q 30/00 (2012.01)
G06Q 30/06 (2012.01)

(52) U.S. Cl.
CPC ..... *G06Q 30/0631* (2013.01); *G06Q 30/0643* (2013.01)

(58) Field of Classification Search
CPC ............ G06Q 30/0601–30/0645; G06Q 30/08
USPC ...................................... 705/26.1–27.2, 26.7
See application file for complete search history.

(56) References Cited

U.S. PATENT DOCUMENTS

| | | |
|---|---|---|
| 6,751,620 B2 | 6/2004 | Orbanes et al. |
| 7,175,079 B1 | 2/2007 | Silverbrook et al. |
| 7,627,502 B2 | 12/2009 | Cheng et al. |
| 7,712,035 B2 | 5/2010 | Giannini |
| 7,756,752 B2 | 7/2010 | Duvall et al. |
| 7,779,014 B2 | 8/2010 | York et al. |
| 7,805,431 B2 | 9/2010 | Siegel |
| 8,078,499 B1 | 12/2011 | Gianinni et al. |
| 8,103,551 B2 | 1/2012 | Saul et al. |
| 8,108,260 B2 | 1/2012 | Maguire et al. |
| RE43,220 E | 2/2012 | Tillman |
| 8,117,085 B1 * | 2/2012 | Smith ......................... 705/26.7 |
| 8,346,625 B2 | 1/2013 | Song |
| 8,370,203 B2 | 2/2013 | Dicker et al. |
| 8,438,081 B2 | 5/2013 | Gray et al. |
| 8,560,398 B1 * | 10/2013 | Gregov .................. G06Q 30/06 705/26.2 |
| 8,600,837 B2 | 12/2013 | King et al. |
| 8,621,359 B2 | 12/2013 | Cao et al. |

(Continued)

OTHER PUBLICATIONS

"Add Label Cloud 3D Rotating Label." ietchankun.blogspot.com. Jun. 23, 2011. Accessed Jan. 31, 2017.*

(Continued)

*Primary Examiner* — Matthew Zimmerman
*Assistant Examiner* — Katherine O'Sullivan

(57) ABSTRACT

A computer-implemented method for generating a recommendation of a personalized ensemble. The method includes accessing customer data associated with a customer; enabling display of items on a three-dimensional shape; enabling selection of one of the items; and dynamically generating a recommendation of a personalized ensemble for the customer based on the selection of one of the items.

17 Claims, 28 Drawing Sheets

(56) References Cited

U.S. PATENT DOCUMENTS

| | | |
|---|---|---|
| 2006/0224406 A1 | 10/2006 | Leon et al. |
| 2007/0130020 A1* | 6/2007 | Paolini ................. 705/26 |
| 2008/0040341 A1 | 2/2008 | York et al. |
| 2008/0046343 A1 | 2/2008 | Maguire et al. |
| 2008/0114778 A1 | 5/2008 | Siegel |
| 2008/0177640 A1 | 7/2008 | Gokturk et al. |
| 2008/0195507 A1 | 8/2008 | Ratnakar |
| 2008/0295037 A1* | 11/2008 | Cao ................. G06F 3/0482 715/852 |
| 2009/0037295 A1 | 2/2009 | Saul et al. |
| 2009/0094260 A1 | 4/2009 | Cheng et al. |
| 2010/0017272 A1 | 1/2010 | Gianinni et al. |
| 2010/0030578 A1 | 2/2010 | Siddique et al. |
| 2010/0030663 A1* | 2/2010 | Wannier ............ G06Q 10/043 705/26.1 |
| 2010/0077640 A1 | 4/2010 | Randall |
| 2010/0094729 A1* | 4/2010 | Gray ................. G06Q 30/06 705/26.1 |
| 2010/0100455 A1 | 4/2010 | Song |
| 2010/0191582 A1* | 7/2010 | Dicker et al. ................. 705/10 |
| 2010/0228646 A1 | 9/2010 | Heidel |
| 2011/0060659 A1 | 3/2011 | King et al. |
| 2012/0054622 A1* | 3/2012 | Nankani ............ G06F 3/04815 715/730 |
| 2012/0144325 A1 | 6/2012 | Mital et al. |
| 2012/0185996 A1 | 7/2012 | Goldberg et al. |
| 2012/0221433 A1 | 8/2012 | Plattsmier et al. |
| 2013/0185642 A1* | 7/2013 | Gammons ............ G06F 3/0482 715/733 |
| 2013/0215116 A1 | 8/2013 | Siddique et al. |
| 2013/0268377 A1 | 10/2013 | Jessup et al. |
| 2013/0346234 A1 | 12/2013 | Hendrick et al. |
| 2014/0019281 A1 | 1/2014 | O'Dell |
| 2014/0035913 A1 | 2/2014 | Higgins et al. |
| 2014/0067596 A1 | 3/2014 | McGovern et al. |
| 2014/0089135 A1 | 3/2014 | Linh et al. |
| 2014/0279197 A1 | 9/2014 | Ainsworth, III et al. |
| 2014/0330670 A1 | 11/2014 | Ainsworth, III et al. |
| 2015/0095187 A1 | 4/2015 | Ainsworth et al. |
| 2015/0106995 A1 | 4/2015 | Ampofo et al. |
| 2015/0161674 A1 | 6/2015 | Khoury et al. |
| 2015/0170250 A1 | 6/2015 | Dalal et al. |
| 2015/0186965 A1 | 7/2015 | Salsberg |
| 2016/0048853 A1 | 2/2016 | Bhattacharjya et al. |
| 2016/0098775 A1 | 4/2016 | Ainsworth, III et al. |
| 2016/0098776 A1 | 4/2016 | Ainsworth, III et al. |
| 2016/0098784 A1 | 4/2016 | Ainsworth, III et al. |
| 2016/0140639 A1 | 5/2016 | Ainsworth, III et al. |
| 2016/0210602 A1 | 7/2016 | Siddique et al. |

OTHER PUBLICATIONS

"10 Awesome jQuery Tag Cloud Plugins." websanova.com. Apr. 9, 2012. Accessed Jan. 31, 2017.*

* cited by examiner

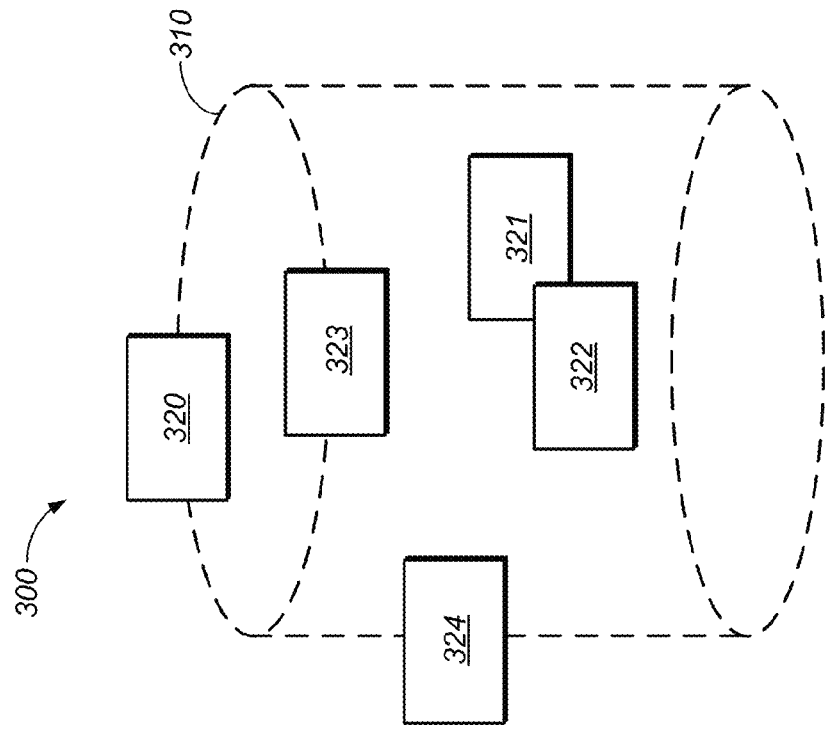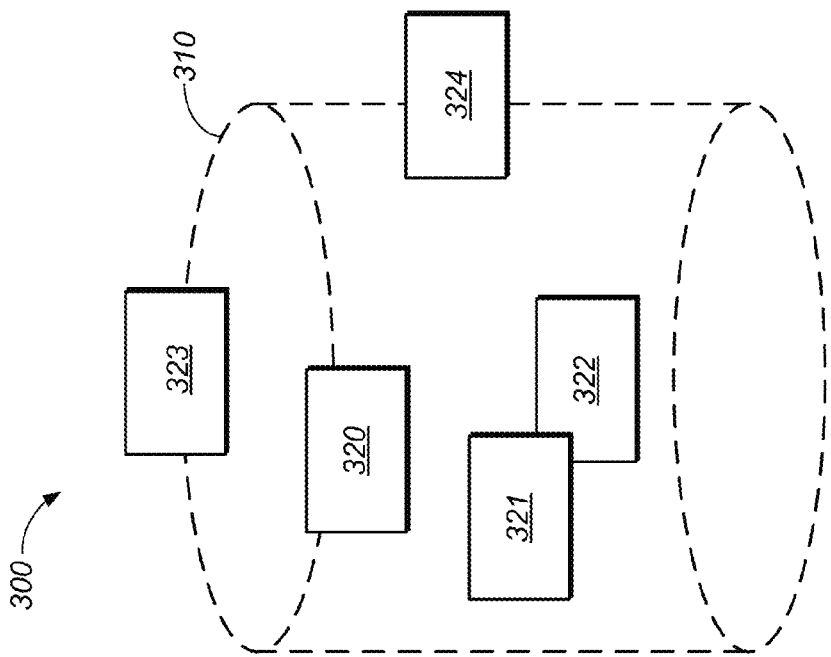

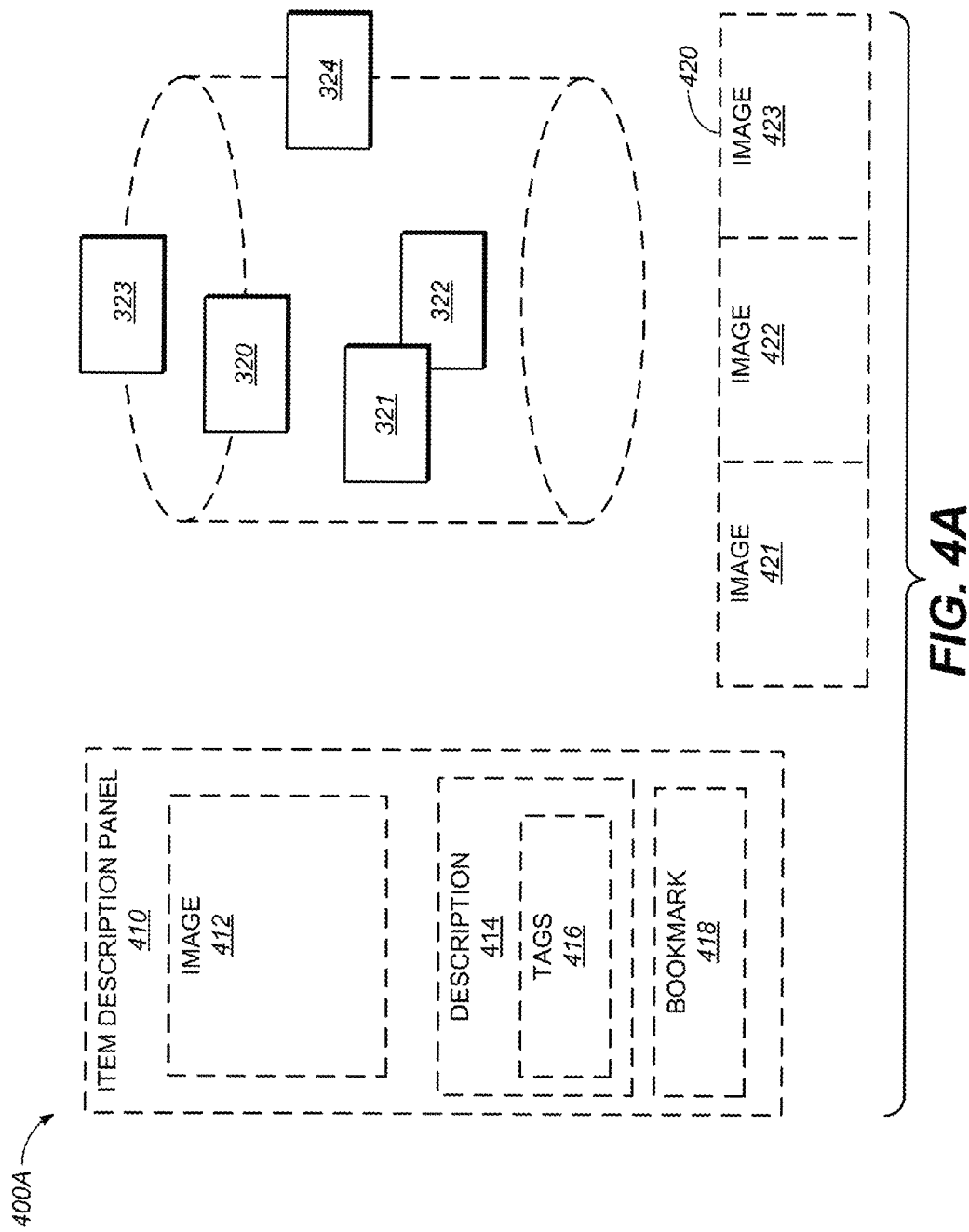

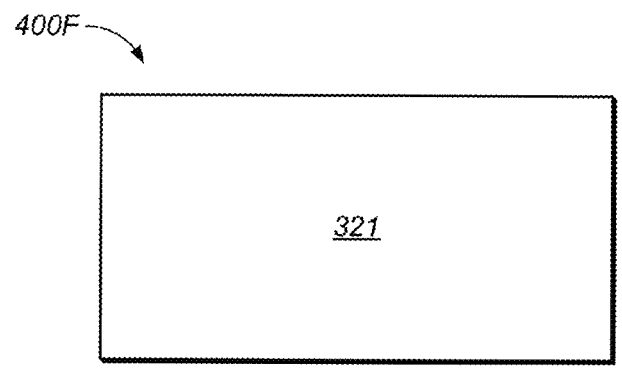
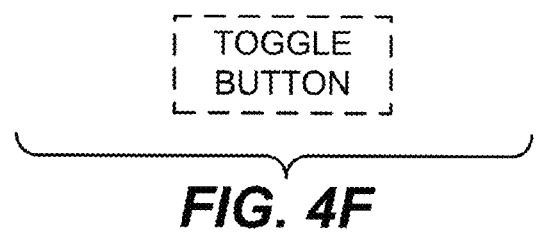
FIG. 4F
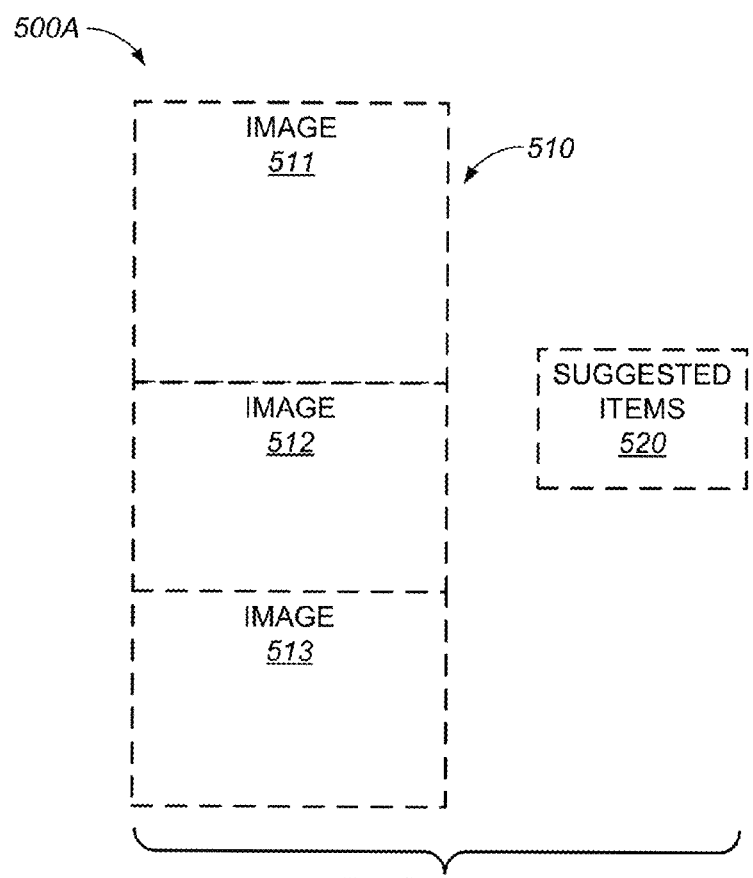
FIG. 5A

900

```
┌─────────────────────────────────────────────────────────┐
│ ENABLE BOOKMARKING ITEMS OF INTEREST FROM A PLURALITY   │
│ OF DISPLAYED ITEMS, WHEREIN THE PLURALITY OF DISPLAYED  │
│    ITEMS ARE DISPLAYED ON A THREE-DIMENSIONAL SHAPE     │
│                           910                           │
└─────────────────────────────────────────────────────────┘
                              │
                              ▼
┌─────────────────────────────────────────────────────────┐
│   ENABLE DISPLAYING THE BOOKMARKED ITEMS OF INTEREST    │
│                  IN A FILMSTRIP FORMAT                  │
│                           920                           │
└─────────────────────────────────────────────────────────┘
                              │
                              ▼
┌─────────────────────────────────────────────────────────┐
│      ENABLE DISPLAYING AGGREGATE ATTRIBUTES OF THE      │
│  BOOKMARKED ITEMS OF INTEREST IN CONJUNCTION WITH THE   │
│                     FILMSTRIP FORMAT                    │
│                           930                           │
└─────────────────────────────────────────────────────────┘

┌─────────────────────────────────────────────────────────┐
│    ENABLE DISPLAYING AGGREGATE ATTRIBUTES SELECTED      │
│    FROM A GROUP CONSISTING OF: AGGREGATE PRICE, AND     │
│                      AGGREGATE COUNT                    │
│                           940                           │
└─────────────────────────────────────────────────────────┘
```

*FIG. 9*

METHOD AND MEDIUM FOR RECOMMENDING A PERSONALIZED ENSEMBLE

CROSS-REFERENCE TO RELATED U.S. APPLICATIONS

This Application is related to U.S. patent application Ser. No. 14/041,765, entitled, "DISPLAYING ITEMS ON A 3-D SHAPE," by Richard Ainsworth et al. with filing date Sep. 30, 2013, and assigned to the assignee of the present application.

BACKGROUND

Presentation and layout of merchandise on a website can negatively affect the conversion rate of the merchandise. For example, if a consumer is interested in purchasing a shirt, the consumer may have to scroll through thousands of shirts. As a result, the consumer may become discouraged and fatigued and decide to leave the website and not purchase a shirt.

A website may only display a few items on each page. This requires multiple page scrolls to view all of the items which may lead to user fatigue. Additionally, this limits the ability for the user to compare and contrast items that are on different pages.

If an item is selected by a user, a product information page is downloaded. The new product information page may hide merchandise on the previously viewed page. Also, the product information page takes time to download which limits the speed at which the user is able to view other items.

Moreover, recommendations provided to a customer are not personalized. Accordingly, the customer is not interested in purchasing the recommended items.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 3A-C are block diagrams that illustrates embodiments of images associated with a 3-D object.

FIG. 4A is a block diagram that illustrates an embodiment of images associated with a 3-D object.

FIGS. 4B-F are screen shots of displayed items.

FIG. 5A is a block diagram that illustrates an embodiment of images selected for purchase.

FIG. 9 depicts a flow diagram for a method for displaying items selected for purchase, according to various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
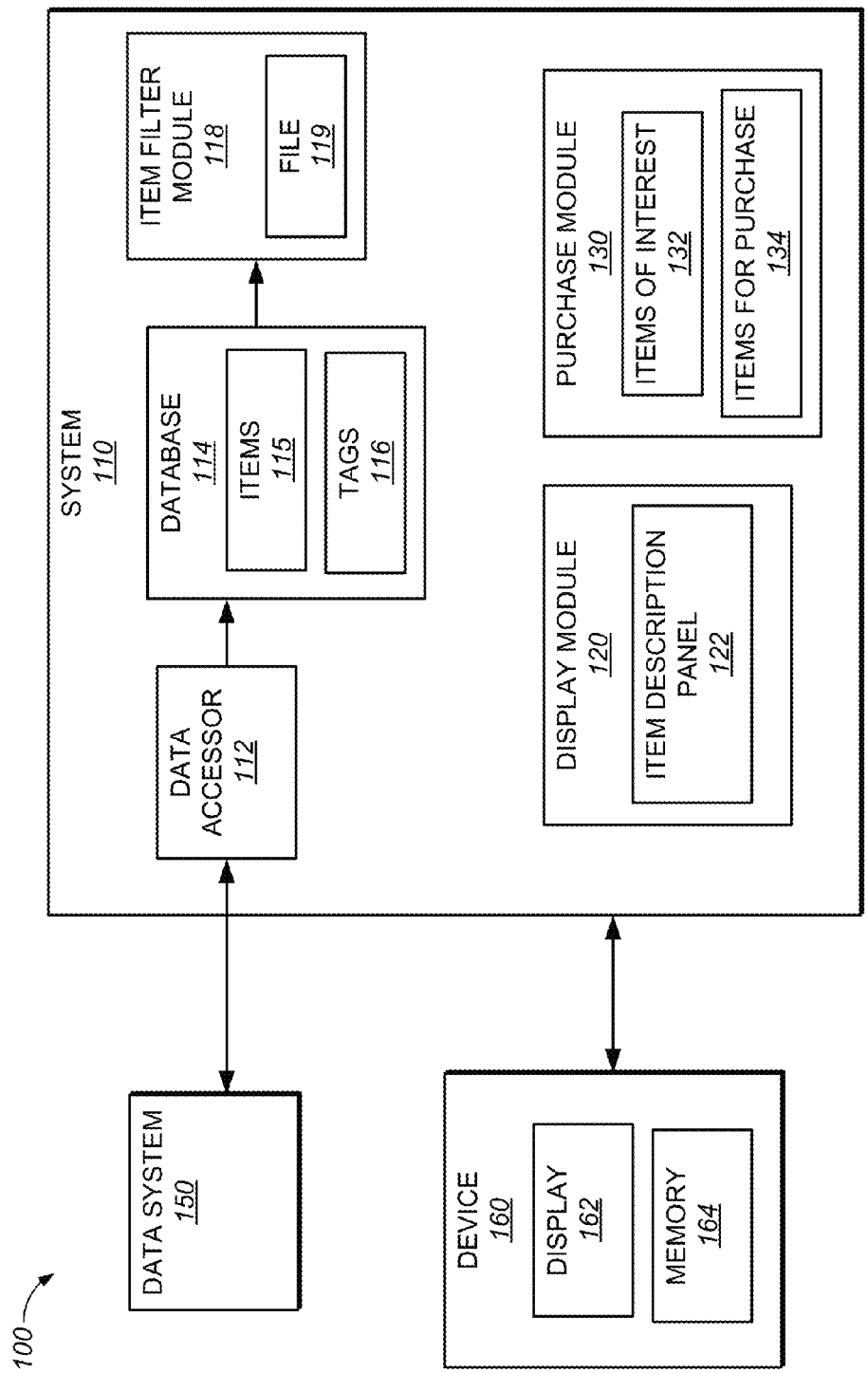
FIG. 1 is a block diagram that illustrates an embodiment of a computing system.

FIG. 1 depicts a block diagram that illustrates an embodiment of computing system 100. Computing system 100 includes, among other things, system 110 and device 160 and data system 150.

In general, system 110 is configured to filter a large volume of image based data such that a user is able to efficiently view the image based data. That is, system 110 filters a large volume of image based data such that a user is able to view many of the images and still have an optimal and efficient viewing experience. In other words, system 110 manages a user experience by preventing too many items for display or not enough, thereby allowing for optimal display of items based on available items and tags.

For example, system 110 filters a large volume of retail merchandise images such that a user of device 160 is able to efficiently view large volumes of desired retail merchandise images that results in an increased likelihood of conversion, which will be described in further detail below. In particular, a user is able to view a large volume of retail merchandise images without requiring scrolling through multiple pages and clicking on multiple images.

It should be appreciated that system 110 is able to filter large volumes of various data. For example, system 110 is able to filter a directory of individuals. In such an example, system 110 filters employees of a business or enterprise.

System 110 can be any computing system that is able to access data (e.g., image data), filter the data and enable viewing of the data. For example, system 110 can be, but is not limited to, a web server, an application server or the like.

System 110 includes data accessor 112 that accesses data, such as, image data. The data can include at least an image and a description or tags associated with the image. For example, image data of a men's long sleeve red shirt includes an image of the long sleeve red shirt and tags associated with the shirt. For example, tags describing the shirt can be, but are not limited to: men's, long sleeve, red, shirt, etc.

In one embodiment, data accessor 112 accesses data from data system 150. The accessing by data accessor 112 can be accomplished by pushing, polling, etc.

The accessed data is then stored in database 114. For example, the image data can be stored as items 115 (e.g., images of retail items) and tags 116 (e.g., descriptions of the retail items).

Data accessor 112 can access information for various numbers of items. For example, thousands or tens of thousands of items may be accessed and stored in database 114 for subsequent viewing.

In one embodiment, data accessor 112 is a web crawler.

For example, the web crawler systematically accesses data of a web server(s) of a retailer (e.g., Target™, Gap™, J.Crew™, etc.). In such an example, the web crawler accesses information regarding various clothing items from a retailer. One of the items can be a pair of men's blue denim jeans. As such, an image of the jeans is accessed as well as tags describing the jeans. The tags describing the jeans can be, but are not limited to, men's, jeans, denim, and blue.

Accordingly, the data accessed by the web crawler is stored in database 114 for subsequent use by system 110, which will be described in further detail below.

In various embodiments, system 110 is communicatively coupled to various data systems (e.g., eCommerce sites). For example, system 110 is communicatively coupled (via the Internet) to a plurality of web servers of various retailers.

The tags and images from different eCommerce sites can be partitioned such that the tags and images from one eCommerce site are separated from tags and images from other eCommerce sites. Alternatively, tags and images from different eCommerce sites may be mixed together.

Also, system 110 may be embedded in a retailer's eCommerce site.

System 110 also includes item filter module 118 configured to filter items 115 and/or associated tags 116 in order to manage the amount of items and/or tags that are viewed by a user. As a result, the filtering of items 115 and tags 116 allows for, among other things, a user to see the words that can be used for searching the items which then allows for subsequent viewing of the items, which will be described in further detail below.

In particular, item filter module 118 generates file 119 that facilitates in enabling the efficient searching of items and subsequent viewing of items that are of interest to the user.

In various embodiments, item filter module 118 utilizes various algorithms or data analysis methods (or variations/combinations thereof) to generate file 119. Such algorithms/methods, can be, but are not limited to, clustering, folksonomy, associated mean cluster, etc.

In general, clustering is the task of grouping a set of objects in such a way that objects in the same group (e.g., cluster) are more similar to each other than to those in other groups or clusters. Additionally, folksonomy is a system of classification derived from the practice and method of collaboratively creating and managing tags to annotate and categorize content.

Figure 2:
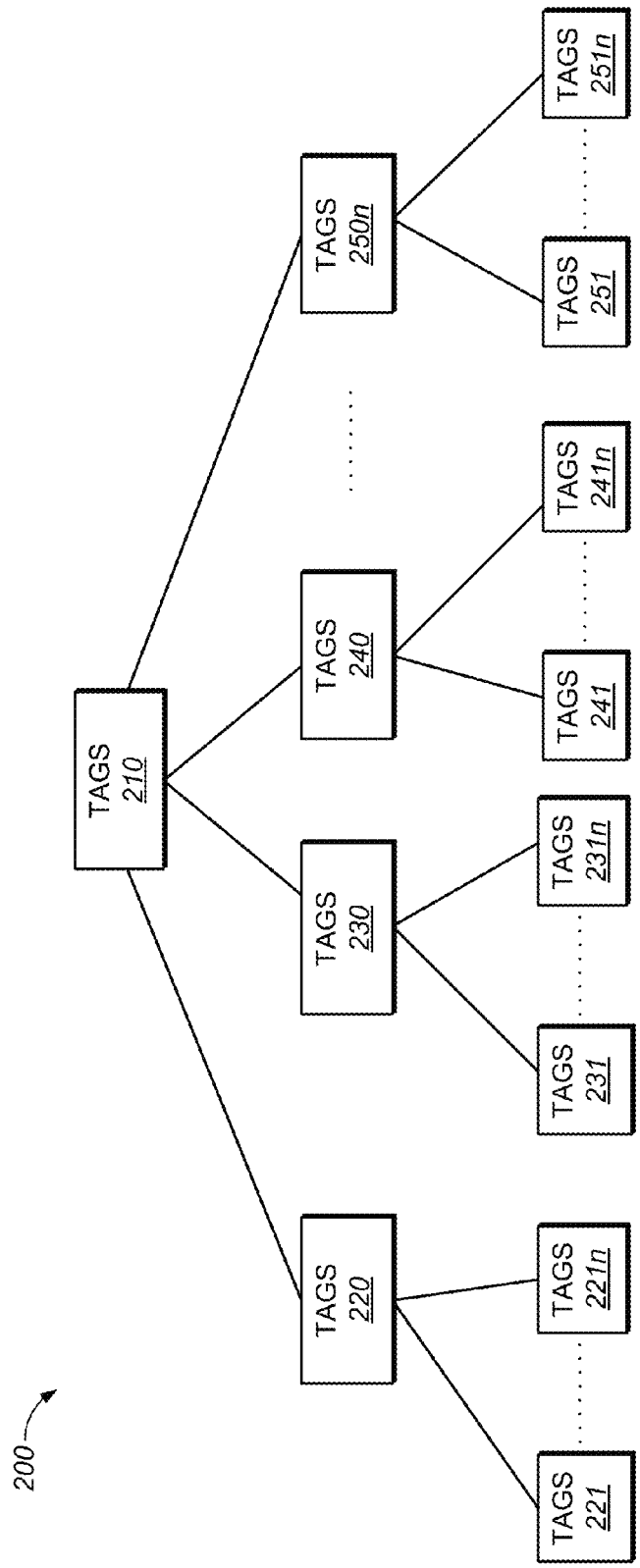
FIG. 2 is a block diagram that illustrates an embodiment of an algorithm for grouping item descriptions.

FIG. 2 depicts an embodiment of an algorithm utilized by item filter module 118 to generate file 119.

For example, data accessor 112 accesses 1000 retail items from an eCommerce site or a plurality of eCommerce sites. The 1000 retail items have various tags that describe the respective items. The tags for the 1000 retail items are referenced as tags 210.

Tags 210 are narrowed down to various subsets of tags. For example, tags 210 are narrowed down into a first set of tags, referenced by tags 220, 230, 240 and 250n. It should be appreciated that tags 210 can be narrowed down into any number of groups/clusters.

Tags 220, 230, 240 and 250n may be referred to as "seeds" or "nodes."

In one embodiment, tags 210 are tags associated with items of a single eCommerce site. As such, subsequent searching and/or viewing of items associated with the tags are directed towards merchandise from the individual eCommerce site.

In another embodiment, tags 210 are tags associated with items of various eCommerce sites. As such, subsequent searching and/or viewing of items associated with the tags are directed towards merchandise from the various eCommerce sites.

The first set of groupings can be, but are not limited to, the most common descriptions, the most popular descriptions, the most frequently searched descriptions, retail provided descriptions, etc.

For example, the first set of groupings are the most common tags for the 1000 retail items. The most common tags are, but not limited to, shirts, socks, jewelry and shorts. As such, tags 220 are grouping of tags with the description of "shirts." Tags 230 are a grouping of tags with the description of "socks." Tags 240 are a grouping of tags with the description of "jewelry." Tags 250n are a grouping of tags with the description of "shorts."

Moreover, the tags may also be associated with the count for reach tag. Of the 1000 retail items, 400 of the retail items may have a tag of "shirts," 300 of the retail items may have a tag of "socks," 280 of the retail items may have a tag of "jewelry," and 260 of the retail items may have a tag of "shorts."

The same process is repeated to narrow the subsets of tags. For example, the first set of tags is narrowed down into a second set of tags. For example, tags 220 are further narrowed down to tags 221 through tags 221n, tags 230 are further narrowed down to various subsets of tags 231 through tags 231n, tags 240 are further narrowed down to various subsets of tags 241 through tags 241n, and tags 250n are further narrowed down to various subsets of tags 251 through tags 251n, and so on.

More specifically, for example, tags 220 (the grouping of "shirts") are narrowed down to a grouping of tags that includes the descriptions of: men's, long sleeve, polo, etc. In such an example, of the 400 tags of shirts, 80 tags are "men's", 70 tags are "long sleeve", 60 tags are "polo", etc.

In one embodiment, the recursive process, as described above, continues until a subset of tags is narrowed down to a pre-determined threshold number. For example, the recursive process continues until a subset of tags is at or below a threshold of fifty. That is, for example, the process continues for subset of tags 220 until a narrower subset of tags 220 includes a particular description with a count of fifty or less. Likewise, the process continues for subset of tags 230 until a narrower subset of tags 230 includes a particular description with a count of fifty or less, and so on.

If the subset of tags cannot be narrowed down to a pre-defined threshold number, the recursive method continues until a subset of tags is narrowed as much as possible.

It should be appreciated that the predetermined threshold can be any number. In particular, the predetermined threshold number can be a number of images that can be optimally displayed in a single view. In one embodiment, the predetermined threshold number is one-hundred. As such, one-hundred items having a tag with a count at or below the threshold number will be enabled to be displayed in single view, which will be described in further detail below.

Embodiments of pseudo-code related to generating file 119 are provided in Appendix A.

Referring again to FIG. 1, system 110 includes display module 120 configured to generate instructions for display of tags and/or items. The instructions provided to device 160 are based, at least in part, on file 119 generated by item filter module 118.

In one embodiment, the instructions are for displaying images on display 162 of device 160. It should be appreciated that any number of devices may communicate with system 110.

Device 160 can be any device that is able to communicate with system 110 and display images according to instructions received from system 110. In various embodiments, device 160 can be, but is not limited to a laptop computer, desktop computer, tablet computer, smart phone, etc.

More specifically, a user of device 160 is provided with an optimal display of tags/items based on the available tags/items. For example, the user is prevented from viewing too many items displayed on display 162 or the user is prevented from viewing too few of items displayed on display 162.

The display of the tags/items can occur in any fashion that enables for optimal display of the tags/items. For example, the tags/items can be displayed in a "rolodex" format, a cluster diagram, etc. In general, a cluster diagram includes various words connected to each other, via a line, wherein the cluster diagram depicts relationships between the various clusters.

It should be appreciated that various features of system 110 may be configurable. In one embodiment, the tags may be modified. For example, a user may add a new tag to an item or may modify an existing tag.

In various embodiments, various visual features may be modified by the user, such as but not limited to, background color, etc.

FIGS. 3A-B depict embodiments of a display 300 of images (e.g., items 115 and/or tags 116), according to various embodiments.

Display 300 includes images 320, 321, 322, 323 and 324 displayed for viewing by a user. The images are displayed with respect to a three-dimensional (3-D) object 310. In particular, the images for display appear to be attached or coupled to 3-D object 310. In one embodiment, 3-D object 310 is not rendered and therefore, not displayed for the user.

3-D object 310 can be any 3-D shape, such as, but not limited to, a cylinder, a sphere, a carousel, ellipse, etc. Moreover, 3-D object 310 can be any object with any shape (e.g., amorphous outer surface) that is conducive for allowing optimal and efficient display of items. It should be appreciated that the radius of curvature may be changed. Also, a user is able to configure the shape of the 3-D object.

As depicted in FIG. 3A, in one embodiment, image 320 and image 321 are located towards a front surface of 3-D object 310, while image 322 and image 323 are located towards a rear of 3-D object 310 (and behind images 320 and 321). Image 324 is located towards a side of 3-D object 310.

In one embodiment, the images displayed towards the front surface of 3-D object 310 are more prominently displayed than images displayed towards the rear of 3-D object 310. For example, images towards the rear may be smaller, less bright or "greyed," as compared to images towards the front of 3-D object 310.

Now referring to FIG. 3B, 3-D object 310 is rotated such that image 323 and image 322 (displayed in the rear of 3-D object, in FIG. 3A) are now displayed toward the front of 3-D object 310. Accordingly, image 323 and image 322 are displayed more prominently than image 320 and image 321 (which are now located in the rear of 3-D object 310).

It should be appreciated that the images are depicted to be facing forward with respect to the user while rotating around 3-D object 310. For example, the images that are facing forward, while in the front side of 3-D object 310 remain facing forward, while in the rear side of 3-D object 310. Additionally, the images are not required to conform to the shape of the outer surface of 3-D object 310.

In various embodiments, 3-D object 310 can be rotated in either direction about its axis. 3-D object 310 can rotate automatically or in response to user input. Moreover, the rotational speed of 3-D object 310 can change based on user input.

It should be appreciated that, in various embodiments, depending on the shape of the 3-D object, 3-D shape can be rotated in any orientations such that the figures attached to the 3-D object may be prominently displayed to the user. For example, if 3-D object is a sphere, 3-D object may be rotated in any direction with respect to its center point.

In one embodiment, 3-D object 310 may be rotated such that any of the images attached to the 3-D may, at one time, be located towards the front of 3-D object 310.

In another embodiment, the 3-D object 310 is stationary, however, the images move across the outer surface of the 3-D object. For example, the images for display move around the 3-D object as if they were on a conveyer belt that travels along the outer surface of 3-D object 310.

In another embodiment, the images are depicted as the same size with respect to each other and are not required to change in size regardless of their location on 3-D object 310.

In a further embodiment, the images are initially displayed as different sizes with respect to each other and are not required to change in size regardless of their location on 3-D object 310.

Various examples of the use of system 110 are provided below with reference to at least FIGS. 1-3C.

For example, a user of device 160 desires to search or view one or more of a one thousand products listed on an eCommerce site (e.g., data system 150) and potentially purchase one or more products from the eCommerce site. Accordingly, device 160 communicates with system 110 which has stored data from data system 150.

Initially, tags (e.g., tags 116) are displayed on display 162 according to file 119. For example, a first set of tags, such as, tags 220, 230, 240 through 250n (see FIG. 2), and the count of each tag, are displayed as images 321-224, respectively (FIGS. 3A-B). For instance, image 321 depicts "shirts (400)," image 322 depicts "socks (300)," image 323 depicts "jewelry (280)" and image 324 depicts "shorts (260)."

It should be appreciated that any number of tags (and a count of each tag) may be depicted as images for display such that a user is able to view numerous tags, in a single view, and still have an optimal and efficient viewing experience.

The user may rotate 3-D object 310 to view all of the displayed tags, as described above.

Figure 3C:
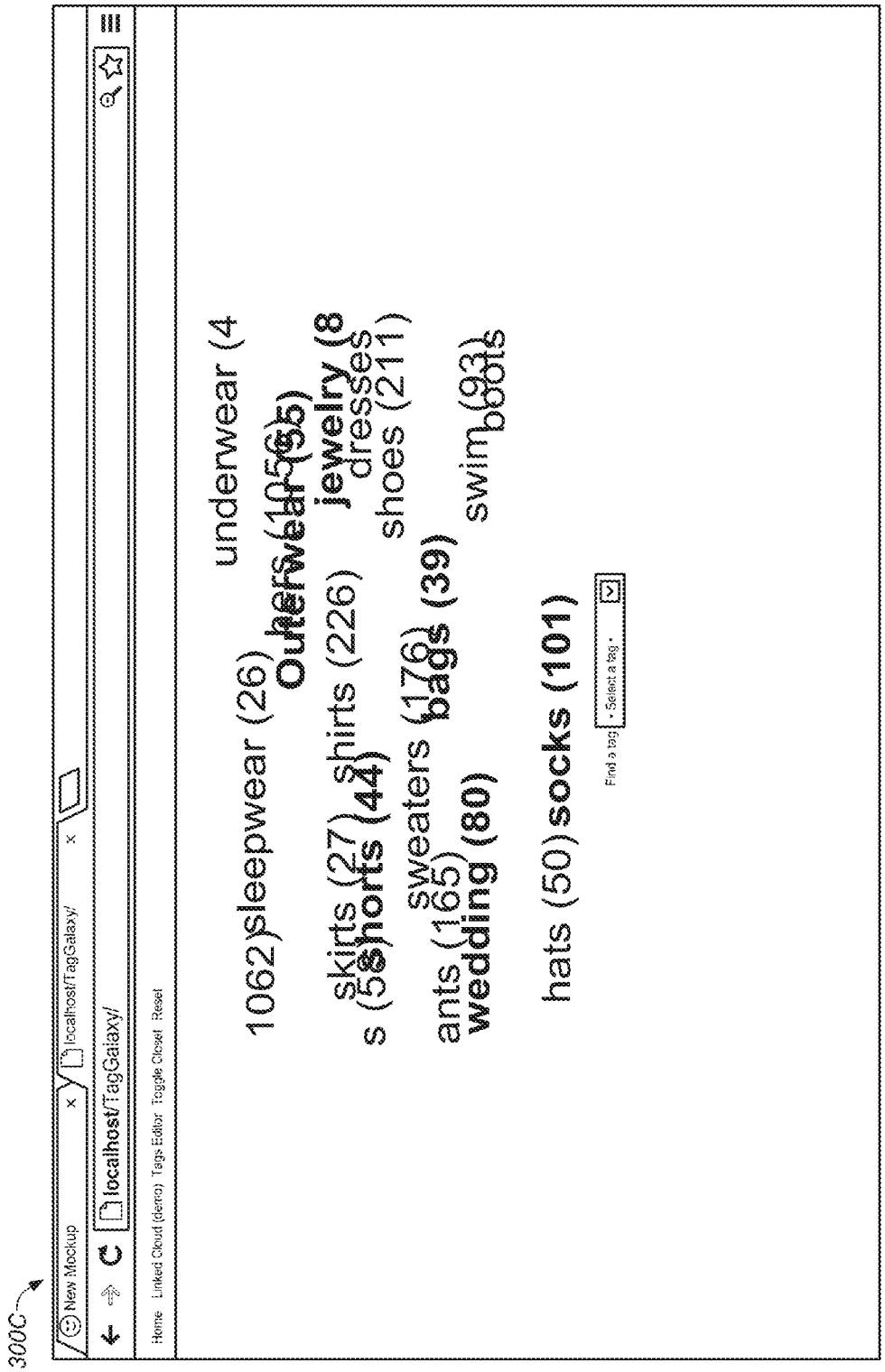

FIG. 3C depicts an embodiment of a display 300C of displayed tags. Various tags with the number of items associated with the tags are depicted. For example, in this depiction, the "bags" tag has 39 items associated with the tag, the "socks" tag has 101 items associated with the tag, etc.

In one embodiment, upon selection of a tag, a second grouping of tags is displayed. For example, if the user selected image 321 associated with tags 220, then a new set of images are displayed associated with tags 221-221n. For instance, if a user selects image 321 (depicting "shirts 400"), then a new set of images is displayed. The new set of images can include image 321 that depicts "men's (80)," image 322 that depicts "long sleeve (70)," image 323 depicting "polo (60)" and image 324 depicting "t-shirt (60)."

The user then selects image 321 that depicts "men's (80)" because the user is interested in viewing the 80 different men's shirts.

In various embodiments, the tags may also be listed in a column, or the like, along a side of the display screen. Also, the tags may be accessed for selection via a dropdown box along the upper portion of the display screen.

In response to the selection of image 321 that depicts "men's (80)," the 80 different men's shirts are displayed on display 162. For example, the 80 images are dispersed around 3-D object 310 such that the user is able to optimally view all 80 images in a single view. Moreover, 3-D object 310 is able to be rotated such that all of the displayed images may be viewed and potentially selected by the user.

In one embodiment, the 80 tags associated with men's shirts is below a pre-determined threshold value, for example, a pre-determined threshold value of 100. As such, any selection of a tag with a count of less than 100 triggers the display of the items associated with the selected tag.

Figure 3D:
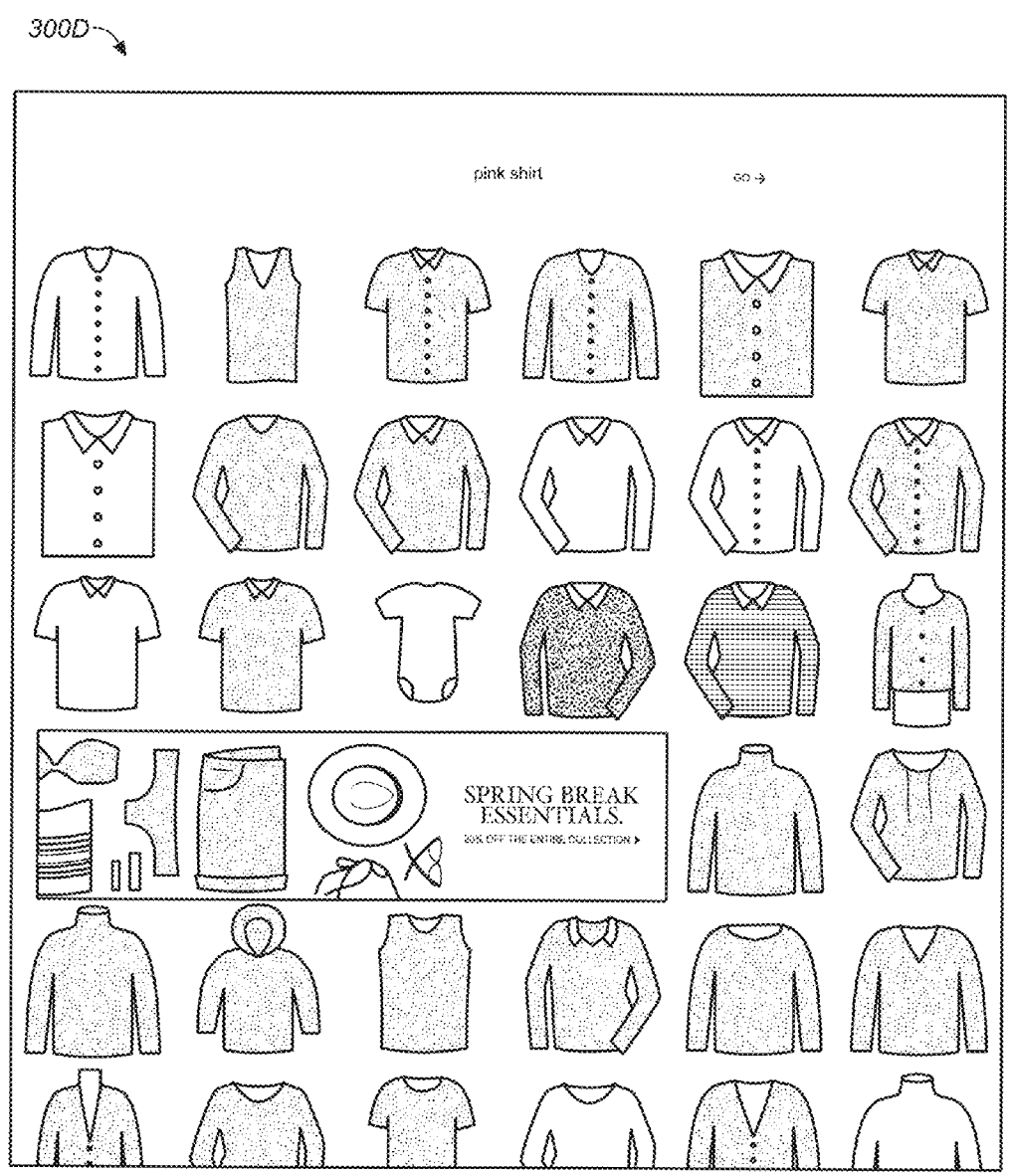
FIG. 3D is a screenshot of displayed items accordingly to an embodiment.

FIG. 3D depicts an embodiment of display 300D that displays various items similar as described above. However, the items are not displayed in association with a 3-D shape.

The user, in one embodiment, is interested in a displayed item and selects the image of the displayed item. For example, the user is interested in the men's flannel shirt that is depicted in image 322. Accordingly, the user selects image 322.

In response to selecting a displayed item, among other things, an item description panel is displayed to provide additional details related to the selected item, which is described in further detail below.

Referring again to FIG. 1, display module 120 generates an item description panel 122 for each of items 115. In general, the item description panel provides various details to further describe the item. For example, item description panel can include, but is not limited to, a photo(s), price, size, tags associated with the item, etc.

Item description panel, in various embodiments, is generated prior to the respective items being displayed to a user. That is, item description panel for each item is generated by system 110 prior to any of the items being displayed and/or selected at device 160.

Moreover, as will be described in further detail below, item description panel is pre-loaded to device 160, for example, to memory 164. Accordingly, when an item is selected on display 162, the item description panel 122 is accessed and displayed in real-time to the user. In other words, item description panel 122 for an item is not required to be loaded to device 160 in response to the item being selected by the user.

FIG. 4A depicts an embodiment of a display 400 of images, according to various embodiments.

Display 400A also depicts embodiments of item description panel 410 and filmstrip 420.

For instance, a user selects image 321 because the user is interested in a shirt that is depicted in image 321. In response to the selection of image 321, item description panel 410 for the shirt (displayed in image 321) is displayed.

In response to the user selecting an image, item description panel 410 is displayed in real-time from a cache or memory 164 of device 160 because item description panel 410 is pre-loaded from system 110.

If a different image is selected, for example, image 323, then a different item description pane for the item displayed in image 323 is displayed in real-time from cache or memory 164 of device 160.

If a user selects image 321 again, then the item description panel for the item displayed in image 321 is reloaded once again from cache or memory such that it is displayed in real-time without requiring re-downloading of the item description panel.

It should be appreciated that item description panels from different sets of items displayed on different 3-D objects can be pre-loaded and subsequently displayed in response to selection of displayed items.

Item description panel 410 can include, but is not limited to, image 412 of the item and description 414 of the item. Image 412 can be an enlarged and/or scalable image of the selected item. Image 412 can be the same as image 321 or different than image 321.

Description 414 can include any description related to the item in the selected image. For example, description can include tags 416 (e.g., tags from file 119), price, etc.

Item description panel 410 may also include a bookmark option (e.g., bookmark 418). That is, a user may select a bookmark button such that the item is set apart for subsequent potential purpose. For example, a user is interested in possibly purchasing the shirt selected in image 321. The user may then select the bookmark button in the item description panel of the shirt. The shirt is then "bookmarked" for subsequent retrieval.

In one embodiment, when an item is bookmarked, the image of the item is placed in a repository, such as filmstrip 420. For example, image 412 of the bookmarked item is stored at photo 421. Other bookmarked items are stored as additional images (e.g., image 422 and 423) in filmstrip 420.

Filmstrip 420 can include any number of bookmarked items. The number of displayed images can be configurable. For example, twenty items may be bookmarked, but only three items may be displayed. However, the filmstrip may be configured to display more or less than three items.

It should be appreciated that filmstrip 420 is a series of images that are displayed for convenient viewing by a user. The filmstrip may be various shapes that allow for images to be viewed in close proximity to one another. In one embodiment, filmstrip 420 is similar to the 3-D shape of a carousel, as described above.

The aggregate total of all the bookmarked items may be displayed proximate filmstrip 420.

In one embodiment, items displayed in filmstrip may be selected for subsequent purchase. For example, a button or the like may be selected by a user to add the items to a purchase basket (e.g., a "closet") or the like.

Embodiments of pseudo-code related to displaying of bookmarked items and the like are provided in Appendix B.

Figure 4B:
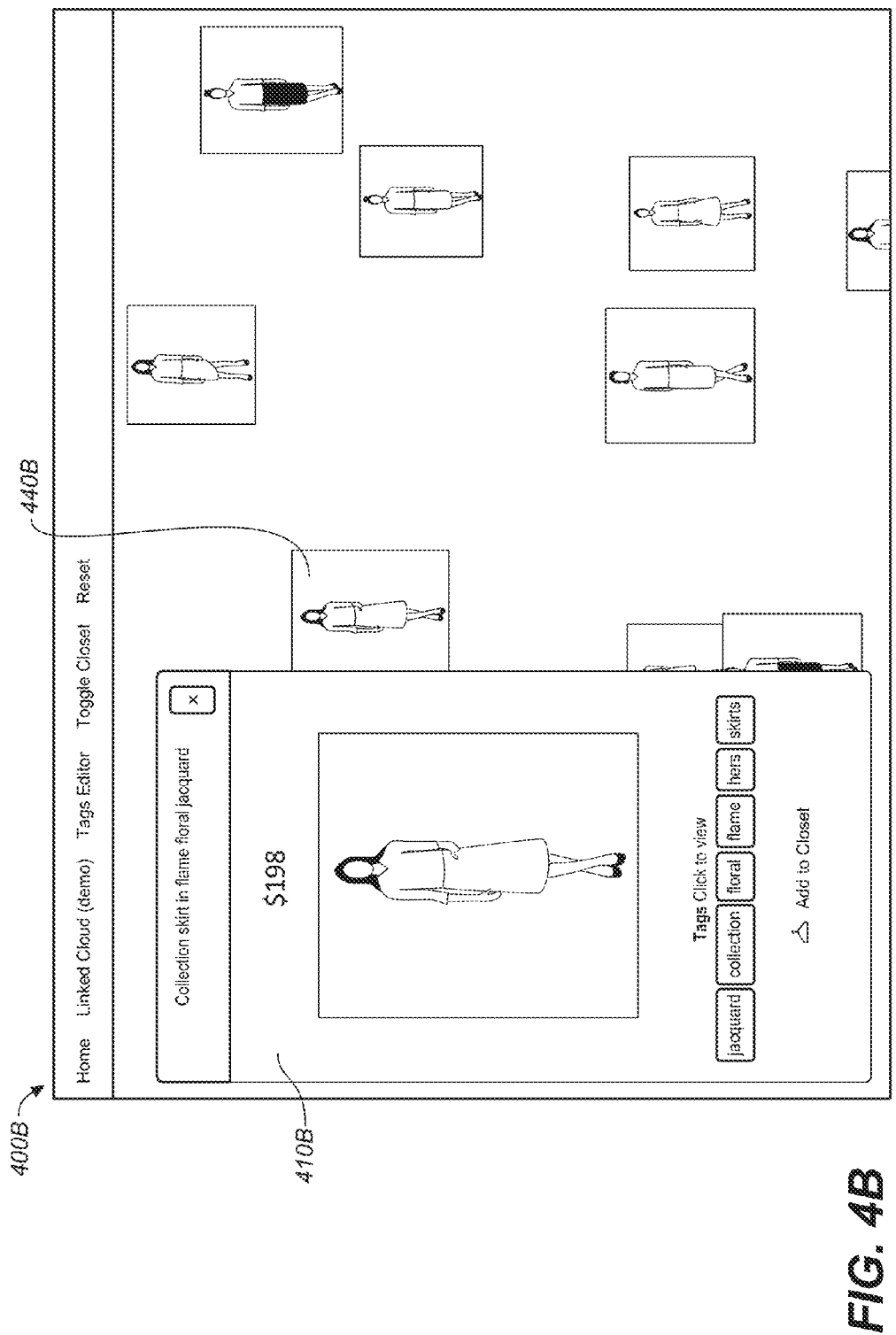

FIG. 4B depicts an embodiment of display 400B that includes various items displayed about a 3-D shape and information regarding a selected item. For example, when item 440B is selected, then item description panel 410B is displayed. Item description panel 410B depicts an item description, tags, price and an "Add to Closet" option.

In one embodiment, if a user selects one of the displayed tags (e.g., "floral"), then the images displayed to the user are refreshed to display images associated with the selected tag (e.g., "floral") are displayed for the user. Likewise, if another tag is selected (e.g., "skirts"), then the images displayed to the user are refreshed to display images associated with the selected tag (e.g., "skirts").

Figure 4C:
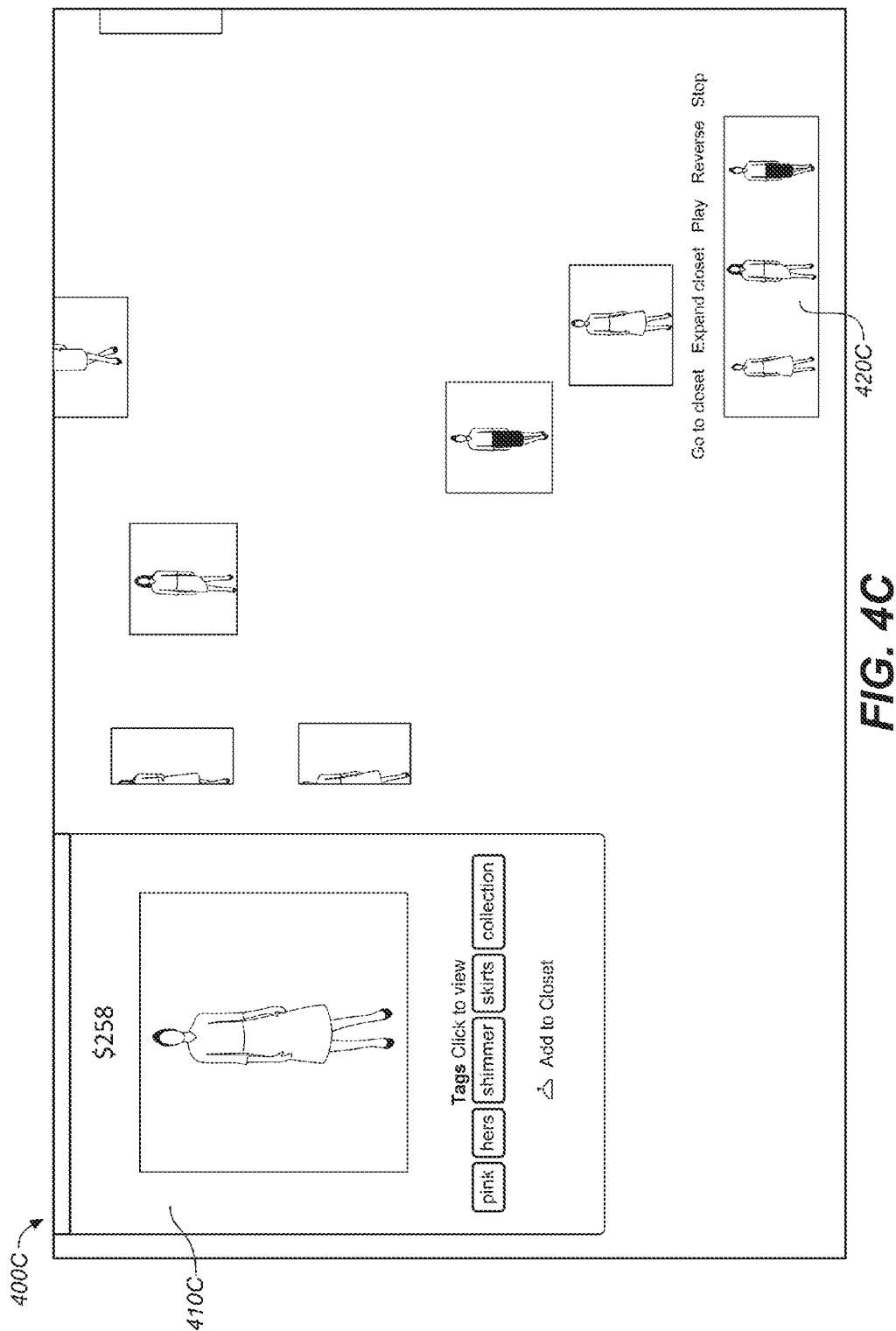

FIG. 4C depicts an embodiment of display 400C that includes various items displayed about a 3-D shape and information regarding a selected item. For example, when a displayed item is selected, item description panel 410C is displayed. The selected item can then be selected to be added to the user's "closet" for purchase. In particular, when the "Add to Closet" button is selected then the item is bookmarked for potential subsequent purchase and displayed in filmstrip 420C.

Figure 4D:
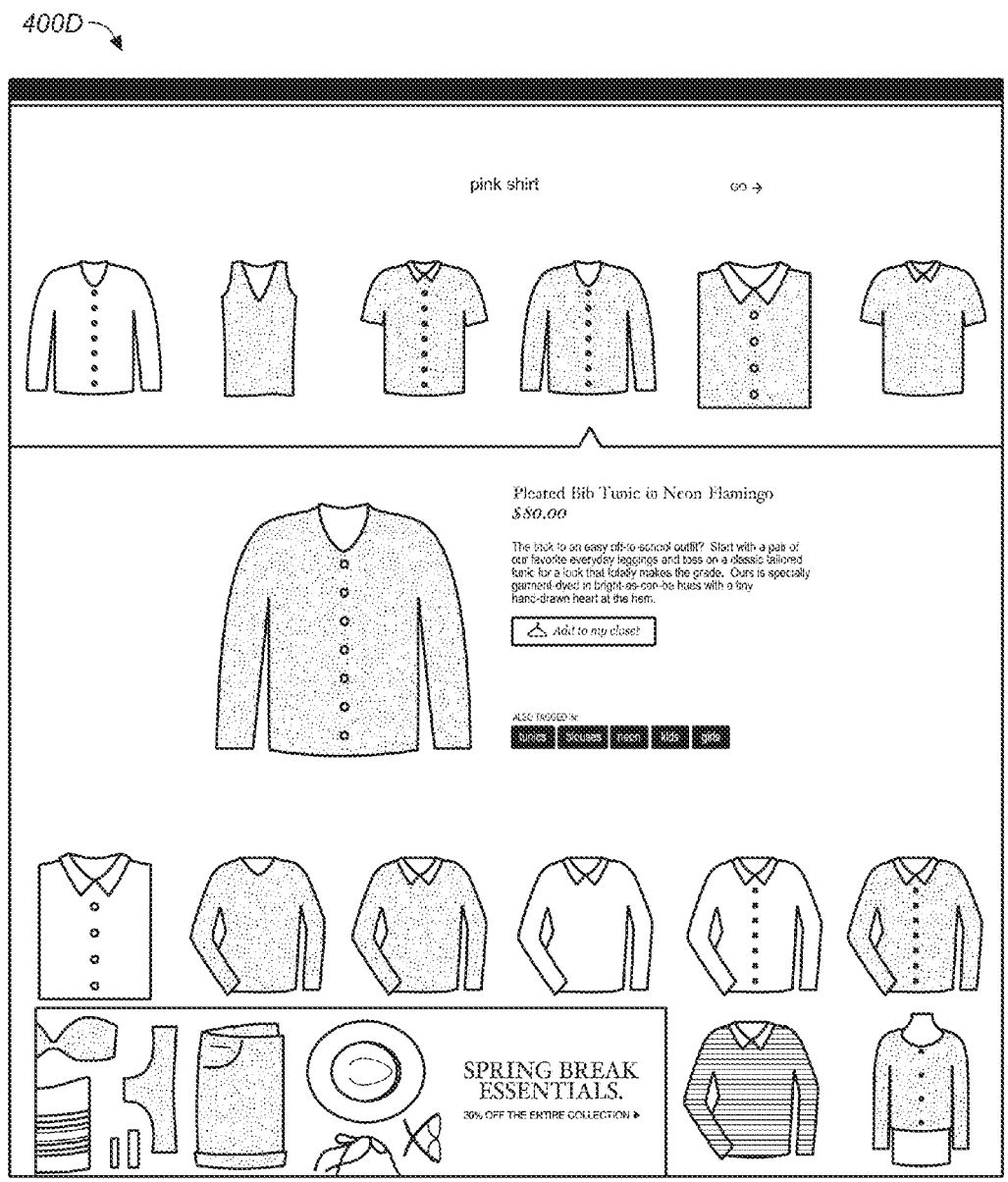

FIG. 4D depicts an embodiment of display 400D that includes various items and information regarding a selected item (e.g., price, description, larger picture of item, etc.). It is noted that the displayed items are not displayed with respect to a 3-D shape.

Figure 4E:
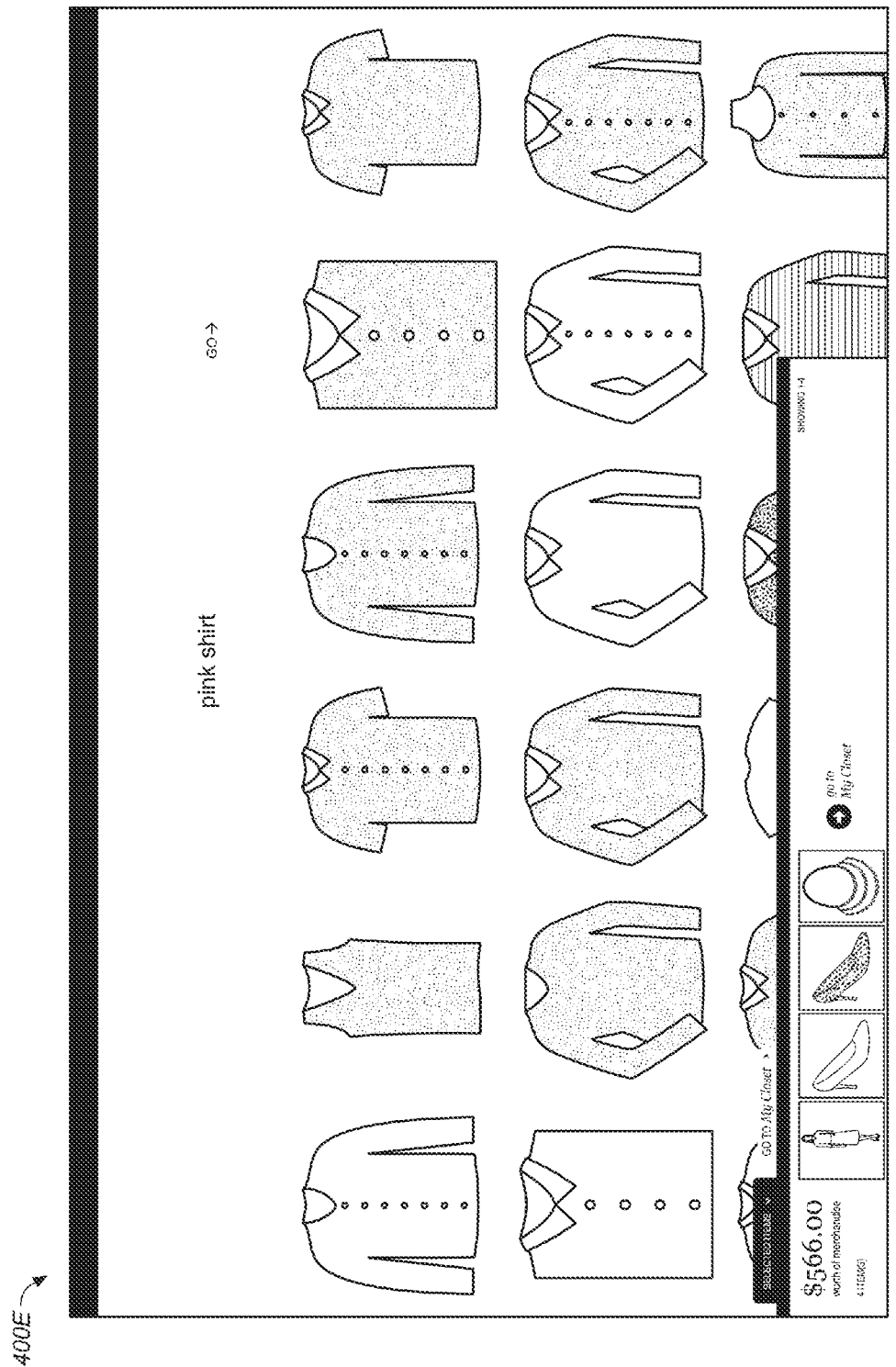

FIG. 4E depicts an embodiment of display 400E that includes various selected items and information regarding the selected items (e.g., aggregate cost and images of the selected items). It is noted that the displayed items are not displayed with respect to a 3-D shape.

FIG. 4F depicts an embodiment of display 400F that includes a depiction of image 321. For example, a user views various items that are shown as images surrounding a 3-D object, as described above. The user selects the item associated with image 321. Then only image 321 is displayed to the user. The user is able to toggle between the exploded view of image 321 and with the display of various images, such as depicted in FIG. 3A. This particular method of display may be utilized for users of mobile devices.

FIG. 5A depicts an embodiment of a display 500A of a purchase basket according to various embodiments.

Purchase basket 510 includes the various items that were selected to be purchased. For example, purchase basket 510 includes the images of items that were selected from filmstrip 420 to be purchased. For instance, purchase basket 510 includes a shirt displayed in image 511, a necklace displayed in image 512 and shoes displayed in image 513.

In one embodiment, suggested items 520 are displayed associated with one or more of items in purchase basket 510. For example, if the shirt in image 511 is selected, then various other suggested items 520 are displayed to the user that are associated to the selected shirt. In such an example, if shirt displayed in image 511 is a button down blue shirt, then suggested items 520 are items that would create an ensemble with the shirt. Accordingly, suggested items 520 may include a watch, trousers, etc. that would "match" or could be worn with the button down blue shirt displayed in image 511.

The user may then select any one of the suggested images which would then be added to purchase basket 510. In one embodiment, any one of the suggested items may be dragged into purchase basket 510.

Upon completion of items added to purchase basket 510, the final items in purchase basket 510 are provided to one or more eCommerce sites for purchase from the eCommerce site(s).

In various embodiments, a user can visit a website, browse merchandise and create collections added to the closet. When ready to checkout, the fulfillment process is managed by system 110, allowing a consumer to provide payment and shipping options without leaving the website.

Order information is then processed and settlement occurs in the background with retailers that have merchandise included in the basket. The merchandise is then directly shipped from the retailer to the consumer. If multiple retailers' products are purchased, the user would receive multiple shipped orders.

Figure 5B:
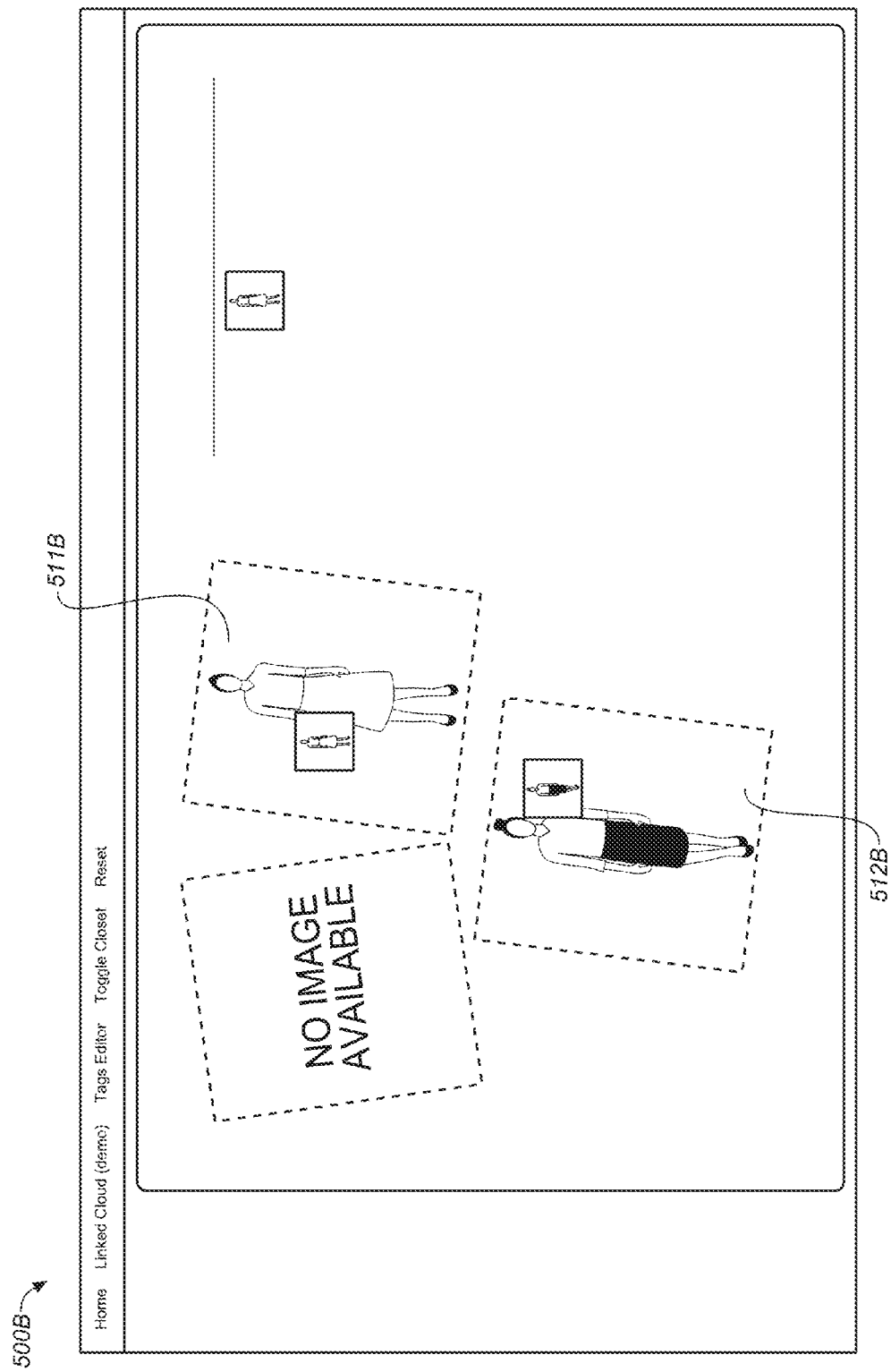
FIGS. 5B-D are screen shots of selected items.

FIG. 5B depicts an embodiment of display 500B that includes various items that were selected for purchase. For example, items 511B and 512B are depicted in a purchase basket. A user can arrange the times (and/or other suggested items) with one another such the various depicted items can be compared with one another to facilitate in a subsequent purchase of one or more of the items.

In various embodiments, system 110 may be utilized within a store. That is, system 110 can be utilized within a brick-and-mortar merchandise store. For example, a user, located in a store, uses device 160, also located in the store, to search for items to purchase, wherein the items are located in the store or may not be located in the store.

Figure 5C:
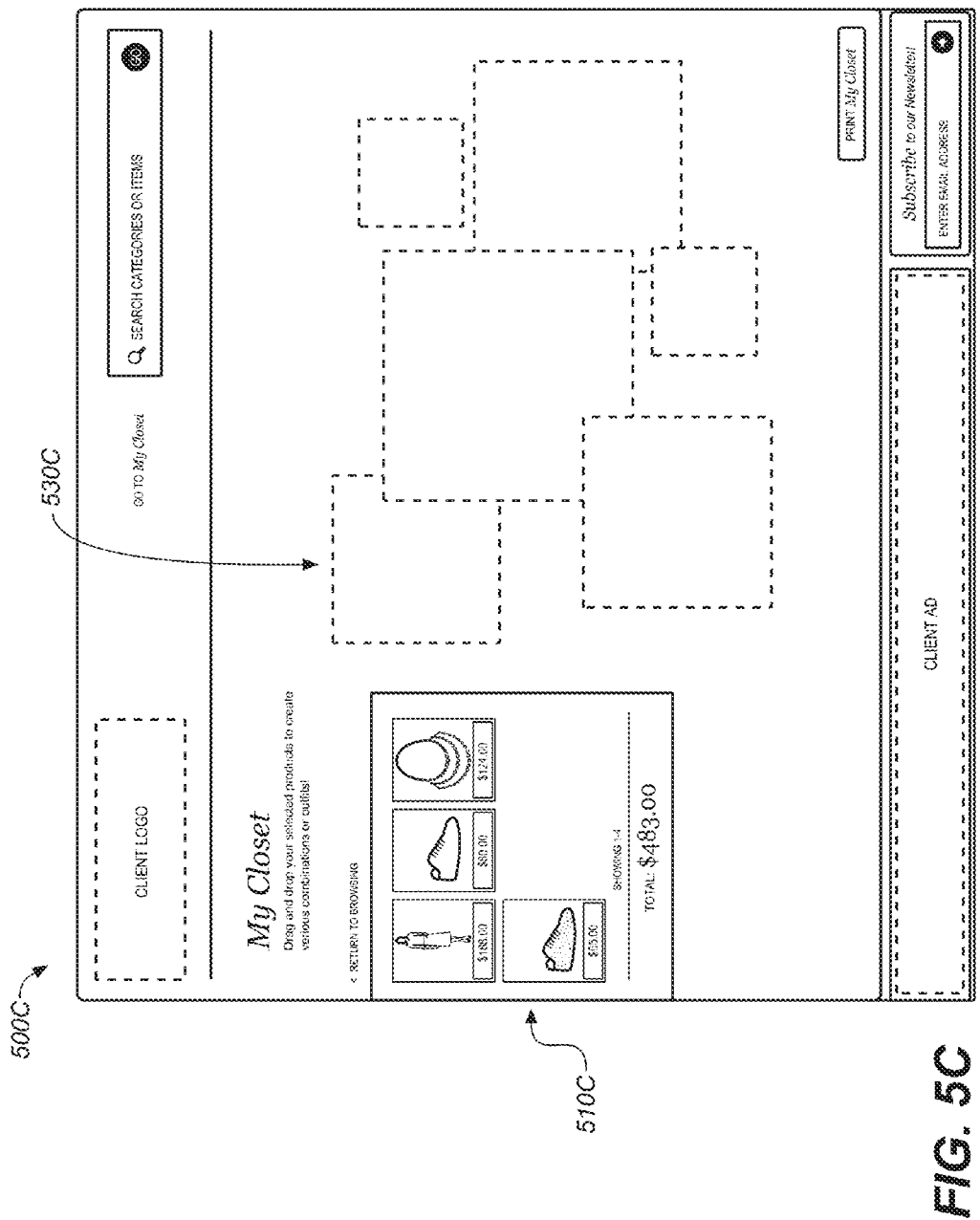
Figure 5D:
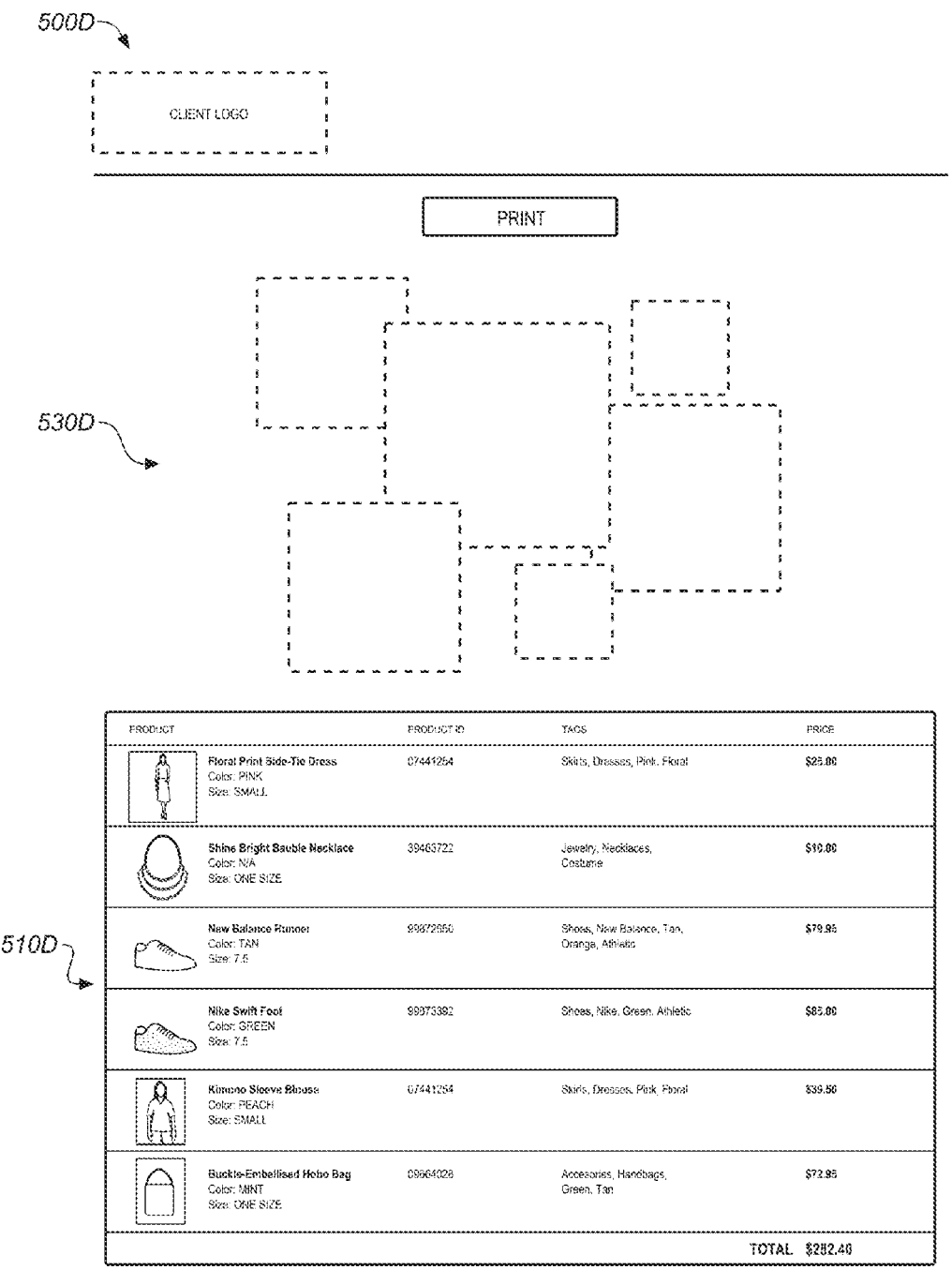

FIGS. 5C and 5D depicts embodiments of display 500C and 500D, respectively, regarding the utilization of system 110 within a store, as described above.

FIG. 5C depicts display 500C that includes selected items 510C (e.g., bookmarked items, items selected to be in a "closet", etc.) that user is interested in purchasing. Display 500C includes an image of each selected item and an aggregate cost of the selected items.

Additionally, a user may drag and drop the selected items into viewing portion 530C. For example, the user may drag and drop some or all of the selected items 510C into the various boxes in the viewing portion. Accordingly, the user is able to move around the boxes (that include the selected items) to compare the items and create various combinations of outfits.

Also, a user is able to print a screenshot of display 500C. As such, the printed screenshot may assist the user in finding and purchasing the items located in the store. For example, a user may hand the printed copy to a sales associate who subsequently attempts to find the items depicted on the printed copy.

FIG. 5D depicts display 500D that includes selected items 510CD (e.g., bookmarked items, items selected to be in a "closet", etc.) that user is interested in purchasing. Display 500D is similar to display 500C, as described above. For example, display 500D includes selected items 510D that a user is interested in purchasing. In particular, display 500D includes an image of each selected item, description of each selected item (e.g., product ID, tags, price, etc.) and an aggregate cost of the selected items.

Additionally, a user may drag and drop the selected items into viewing portion 530D. For example, the user may drag and drop some or all of the selected items 510D into the various boxes in the viewing portion. Accordingly, the user is able to move around the boxes (that include the selected items) to compare the items and create various combinations of outfits.

Also, a user is able to print a screenshot of display 500D. As such, the printed screenshot may assist the user in finding and purchasing the items located in the store. For example, a user may hand the printed copy to a sales associate who subsequently attempts to find the items depicted on the printed copy.

Example Methods of Operation

The following discussion sets forth in detail the operation of some example methods of operation of embodiments. With reference to FIGS. 6, 7, 8, and 9, flow diagrams 600, 700, 800 and 900 illustrate example procedures used by various embodiments. Flow diagrams 600, 700, 800 and 900 include some procedures that, in various embodiments, are carried out by a processor under the control of computer-readable and computer-executable instructions. In this fashion, procedures described herein and in conjunction with flow diagrams 600, 700, 800 and 900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. device 160 and/or system 110). The computer-readable and computer-executable instructions, which reside on tangible computer readable storage media, are used to control or operate in conjunction with, for example, one or some combination of processors of the computer environments. It is appreciated that the processor(s) may be physical or virtual or some combination (it should also be appreciated that a virtual processor is implemented on physical hardware). Although specific procedures are disclosed in flow diagrams 600, 700, 800 and 900, such procedures are examples. That is, embodiments are well suited to performing various other procedures or variations of the procedures recited in flow diagrams 600, 700, 800 and 900. Likewise, in some embodiments, the procedures in flow diagrams 600, 700, 800 and 900 may be performed in an order different than presented and/or not all of the procedures described in one or more of these flow diagrams may be performed. It is further appreciated that procedures described in flow diagrams 600, 700, 800 and 900 may be implemented in hardware, or a combination of hardware with firmware and/or software.

Figure 6:
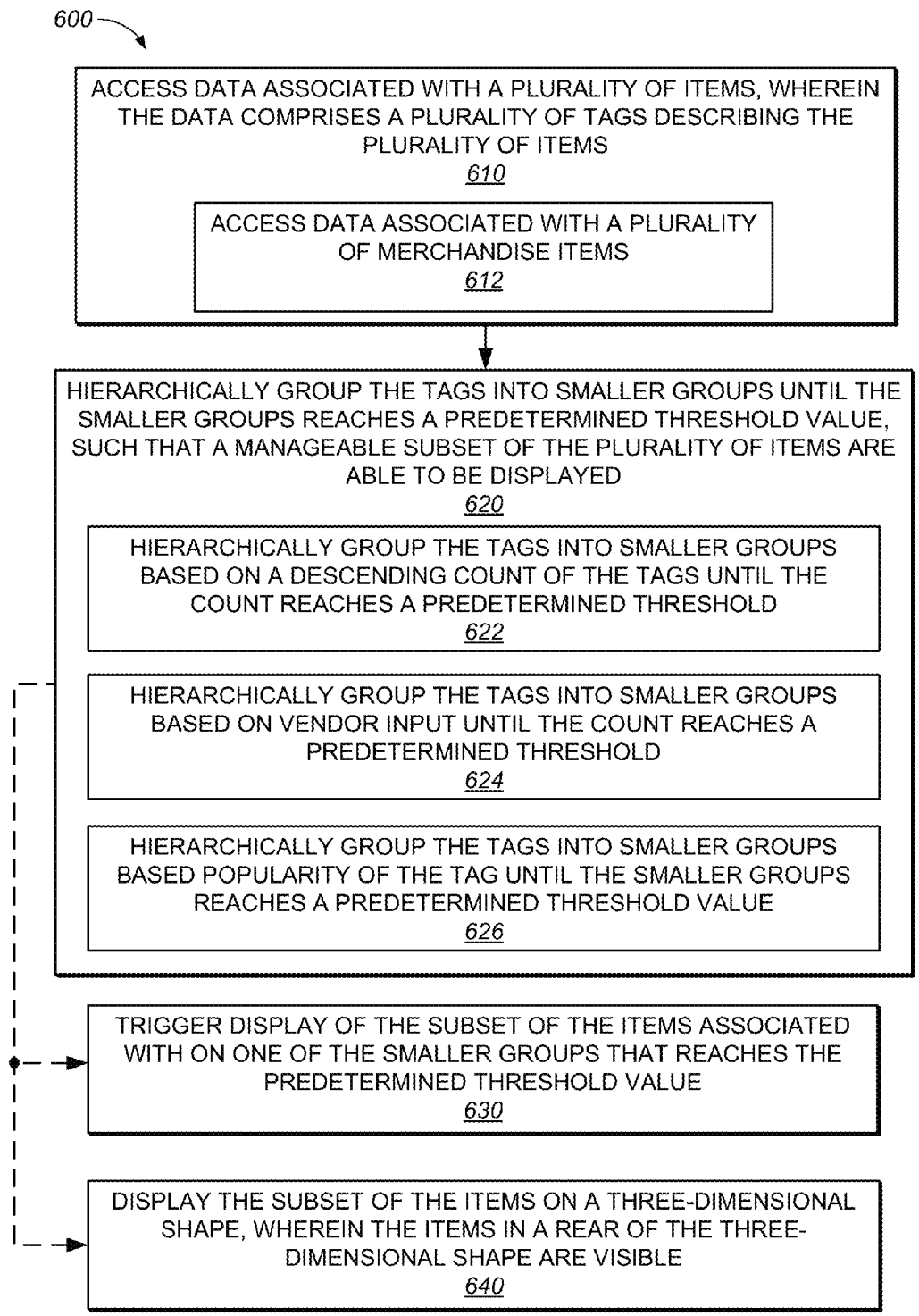
FIG. 6 depicts a flow diagram for a method for grouping tags such that a manageable subset of items may be displayed, according to various embodiments.

FIG. 6 depicts a flow diagram for a method for grouping tags such that a manageable subset of items may be displayed, according to various embodiments.

Referring now to FIG. 6, at 610, data associated with a plurality of items is accessed, wherein the data comprises a plurality of tags describing the plurality of items. For example, data accessor 112 (e.g., a web crawler) accesses various data from data system 150. The data, can be, but is not limited to, tags that describe various items for purchase and images of the items.

The accessing, in one embodiment, is automatically accomplished by data accessor 112 of a computing system, such as system 110. For example, based on instructions from system 110, data accessor 112 automatically periodically accesses data from various eCommerce computing systems (e.g., web servers).

At 612, in one embodiment, data associated with a plurality of merchandise items is accessed. For example, data accessor 112 access data from a variety of eCommerce computing systems (e.g., Walmart™, Target™, GapT™, etc.).

At 620, the tags are hierarchically grouped into smaller groups until the smaller groups reaches a predetermined threshold value, such that a manageable subset of the plurality of items are able to be displayed. For example, data accessor 112 accesses data associated with thousands of items. Displaying thousands of items to a user for purchase may decrease the conversion rate for such items.

As such, item filter module 118 executes an algorithm that hierarchically groups the tags of the items into smaller subgroups until the count of the tags in the subgroups reaches a predetermined threshold value. As a result, a manageable subset of items (associated with the tags in the subgroup that reached the threshold value) are displayed to a user which may result in a higher conversion for the displayed subset of items.

The hierarchical grouping, in one embodiment, is automatically accomplished by item filter module 118 of a computing system, such as system 110. For example, based on instructions from system 110, item filter module 118 automatically periodically filters tags associated with thousands of merchandise items from various eCommerce computing systems (e.g., web servers).

At 622, the group of tags are hierarchically grouped into smaller groups based on a descending count of the tags until the count reaches a predetermined threshold. For example, tags 210 separated into subgroups of tags 220, 230, 240, and 250n which have a tag count smaller than tags 210. Similarly, tags 220, 230, 240, and 250n are each separated into respective subgroups that each have a smaller tag count than their parent.

At 624, the tags are hierarchically grouped into smaller groups based on vendor input until the count reaches a predetermined threshold. For example, tags 210 are narrowed down into a first set of tags, referenced by tags 220, 230, 240 and 250n. Tags 220, 230, 240 and 250n may be provided by a vendor. For example, a retailer may provide system 110 with tags associated with items for sale. Such tags may be shirts, jeans, jewelry, etc. Accordingly, the algorithm will utilize the vendor provided tags to generate file 119, as described above.

At 626, the tags are hierarchically grouped into smaller groups based popularity of the tag until the smaller groups reaches a predetermined threshold value. For example, tags 220, 230, 240 and 250n, respectively, may be popular tags from previous searches or purchases of items. For example, the most purchased items of a retailer includes tags of shoes, bags, skirts, etc. Accordingly, the algorithm will utilize popular tags to generate file 119, as described above.

At 630, the display is triggered when the subset of the items associated with one of the smaller groups reaches the predetermined threshold value. For example, if tags 241 (e.g., "socks") reaches a predetermined threshold of 100 tags, then the display of the 100 items having a tag of "socks" is triggered to be displayed at device 160.

In one embodiment, if the number of subset of items is below a predetermined threshold value, then additional items are displayed to reach the predetermined threshold value. For example, if only two socks are available to display, and the pre-determined threshold value is 25, then 23 additional items are accessed to reach the pre-determined threshold value of 25. The additional items may be related products and/or recommended items, etc.

At 640, the subset of the items are displayed on a three-dimensional shape, wherein the items in a rear of the three-dimensional shape are visible. For example, the 100 items having a tag of "socks" are displayed with respect to 3-D object 310. In particular, items located to the rear of the 3-D object are visible such that they are able to be viewed and selected, even if disposed at least partially behind other images.

It is noted that any of the procedures, stated above, regarding flow diagram 600 may be implemented in hardware, or a combination of hardware with firmware and/or software. For example, any of the procedures are implemented by a processor(s) of system 110 and/or device 160.

Figure 7:
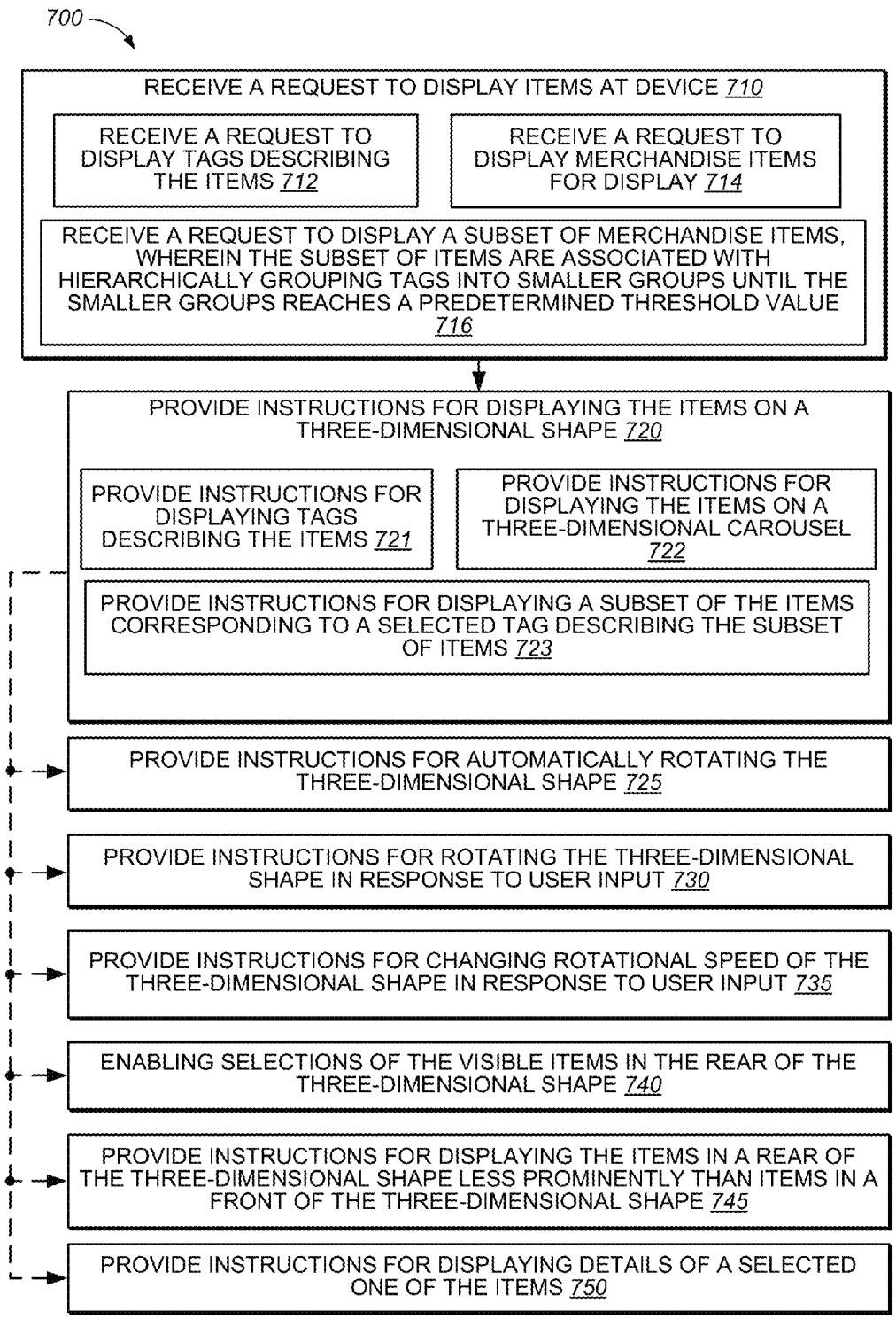
FIG. 7 depicts a flow diagram for a method for providing instructions for displaying items, according to various embodiments.

FIG. 7 depicts a flow diagram for a method for providing instructions for displaying items, according to various embodiments.

Referring now to FIG. 7, at 710, a request is received to display items at device. For example, device 160 is communicatively coupled to system 110. A user initiates a search for various items to be purchased via system 110. As such, a request is sent from device 160 (e.g., via HTTP) to view such items.

The request, in one embodiment, is received at a computing system, such as system 110. For example, based on a request from a computing system (e.g., device 160), display module 120 automatically provides display instructions (e.g., via HTTP) to device 160 such that items or tags associated with the items are displayed on display 162.

At 712, in one embodiment, a request is received to display tags describing the items. For example, a user desires to search various merchandise items from an eCommerce site. As such, a request is received at system 110 to search such items. As a result, display module 120 automatically provides display instructions to device 160 such that tags associated with the items are displayed on display 162 for a subsequent search by the user.

At 714, in one embodiment, a request is received to display merchandise items. For example, upon a request from device 160, display module 120 provides display instructions to device 160 such that tags associated with the items are displayed on display 162 for a subsequent search by the user.

At 716, a request to display a subset of merchandise items is received, wherein the subset of items are associated with hierarchically grouping tags into smaller groups until the smaller groups reaches a predetermined threshold value. For example, a user desires to search various merchandise items from an eCommerce site. As such, a request is received at system 110 to search such items. As a result, display module 120 automatically provides display instructions to device 160 for display of items and/or tags of the items. The instructions for displaying are based on file 119 which is generated from an algorithm that provides for hierarchically grouping tags into smaller groups until the smaller groups reaches a predetermined threshold value.

At 720, Instructions are provided for displaying the items on a three-dimensional shape such that a manageable number of items are able to be displayed for browsing. For example, display module 120 automatically provides display instructions to device 160 for display of items and/or tags of the items. In particular, images located to the rear of the 3-D object are visible such that they are able to be viewed and selected, even if disposed at least partially behind other images.

At 721, instructions are provided for displaying tags describing the items. For example, various tags that describe various items are displayed. Such tags, can be, but are not limited to, shorts, hats, outerwear, sleepwear, etc.

At 722, instructions are provided for displaying the items on a three-dimensional carousel. For example, images of the items, such as images 320-324, are displayed such that they appear to be attached to a 3-D carousel.

At 723, instructions are provided for displaying a subset of the items corresponding to a selected tag describing the subset of items. For example, a user selects a displayed image of "socks" which is a tag describing all items related to socks. Accordingly, all the items with the tag of "socks" is displayed, wherein the items with the tag of socks is a subset of all the items available for purchase.

At 725, instructions are provided for automatically rotating the three-dimensional shape. For example, 3-D object 310 automatically rotates without requiring any user input.

At 730, instructions are provided for rotating the three-dimensional shape in response to user input. For example, 3-D object 310 is initially displayed in a static position. In response to user input, for example, hovering near the 3-D object, the 3-D object rotates such that the various images attached to the 3-D object are able to be viewed without requiring user scrolling or clicking.

At 735, instructions are provided for changing rotational speed of the three-dimensional shape in response to user input. For example, the rotational speed of the 3-D object 310 may be changed based on various gestures, for example, mouse gestures at or near 3-D object 310.

At 740, selections of the visible items in the rear of the three-dimensional shape are enabled. For example, a user views an image of an item that the user is interested in possibly purchasing. As such, the user selects the image of an item located to the rear of the 3-D object.

At 745, instructions are provided for displaying the items in a rear of the three-dimensional shape less prominently than items in a front of the three-dimensional shape. For example, an item in the rear of 3-D object is displayed as a smaller image or is greyed out compared to more prominently displayed items towards the front of the 3-D object.

At 750, instructions are provided for displaying details of a selected one of the items. For example, a user selects an image of an item that the user is interested in. Accordingly, item description panel 410 is displayed which provided additional details/description for the selected item.

It is noted that any of the procedures, stated above, regarding flow diagram 700 may be implemented in hardware, or a combination of hardware with firmware and/or software. For example, any of the procedures are implemented by a processor(s) of system 110 and/or device 160.

Figure 8:
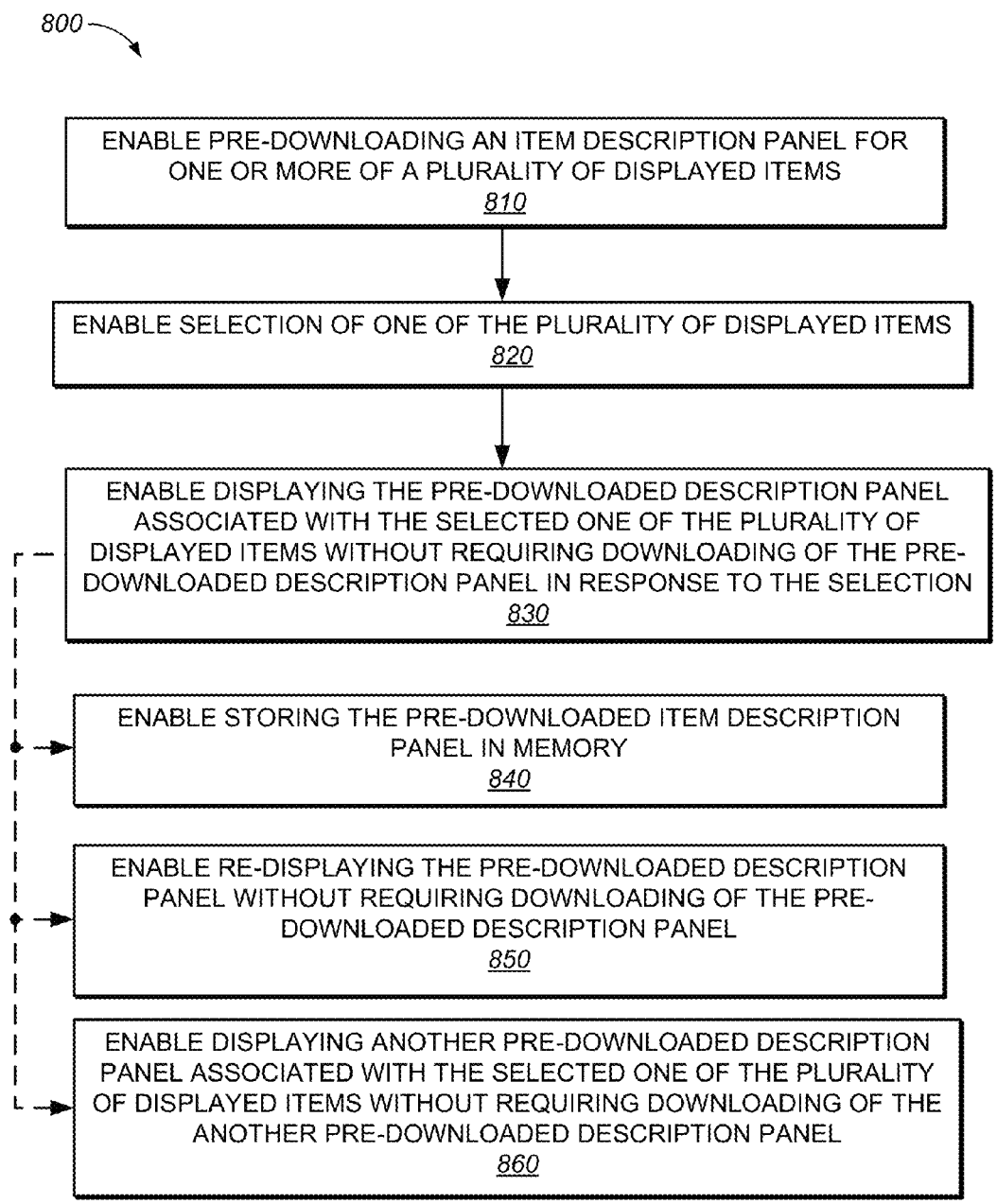
FIG. 8 depicts a flow diagram for a method for display of item details, according to various embodiments.

FIG. 8 depicts a flow diagram for a method for display of item details, according to various embodiments.

Referring now to FIG. 8, at 810, pre-loading an item description panel for one or more of a plurality of displayed items is enabled. For example, each item that is available for searching by a user and/or display by a user device, via system 110, has an associated item description panel that includes a detailed description of the item.

The pre-loading, in one embodiment, is automatically accomplished by system 110 transmitting the item description panels to device 160. For example, prior to a user searching and/or selecting a displayed image of items from one or more eCommerce sites, device 160 automatically loads the item description panels of the items from system 110.

At 820, selection of one of the plurality of displayed items is enabled. For example, system 110 provides instructions to device 160 such that a plurality of items for sale are able to displayed proximate 3-D object 310 on display 162.

At 830, display of pre-loaded item description panel associated with the selected one of the plurality of displayed items is enabled without requiring loading of the pre-loaded item description panel in response to the selection. For example, device 160 loads the item description panels prior to a user searching and/or selecting a displayed image of items from one or more eCommerce sites. As a result, in response to selecting a displayed image of an item, the associated item description panel is loaded immediately for display without requiring loading the item description panel from another location (e.g., system 150, system 110, etc.).

At 840, storing the pre-loaded item description panel in memory. For example, the item description panels are loaded to memory 164 of device 160.

At 850, re-loading the pre-loaded description panel is enabled without requiring loading of the pre-loaded description panel from another location. For example, item description panel 410 is able to be re-displayed by re-loading the item description panel without requiring loading the item description panel from another location (e.g., system 150, system 110, etc.).

At 860, displaying of another pre-loaded description panel associated with the selected one of the plurality of displayed items is enabled without requiring loading of the another pre-loaded description panel. For example, an item description panel is pre-loaded for any item that is able to be displayed to a user. Accordingly, any one of the item description panels associated with the items is able to displayed and re-displayed in response to a user selection, without requiring loading the item description panel from another location.

It is noted that any of the procedures, stated above, regarding flow diagram 800 may be implemented in hardware, or a combination of hardware with firmware and/or software. For example, any of the procedures are implemented by a processor(s) of system 110 and/or device 160.

FIG. 9 depicts a flow diagram for a method for displaying items selected for purchase, according to various embodiments.

Referring now to FIG. 9, at 910, bookmarking items of interest from a plurality of displayed items is enabled, wherein the plurality of displayed items are displayed on a three-dimensional shape. For example, a user is able to bookmark a displayed item if the user is interested in possibly purchasing the item. As a result, the user is able easily retrieve the item for subsequent viewing.

At 920, displaying the bookmarked items of interest in a filmstrip format is enabled. For example, in response to a user bookmarking an item of interest, the item of interest is set apart and displayed in a feature that resembles a filmstrip.

At 930, displaying aggregate attributes of the bookmarked items of interest in conjunction with the filmstrip format is enabled. For example, the aggregate price and aggregate count of the bookmarked items are displayed. In particular, if there are five bookmarked items having a total value of $100, then the number of bookmarked items (e.g., five) and the total value of the bookmarked items (e.g., $100) are displayed.

At 940, selecting one of the bookmarked items for purchase is enabled. For example, a user is able to select a displayed bookmarked item such that a user is able to confirm whether or not to purchase the selected bookmarked item It is noted that any of the procedures, stated above, regarding flow diagram 900 may be implemented in hardware, or a combination of hardware with firmware and/or software. For example, any of the procedures are implemented by a processor(s) of system 110 and/or device 160.

Embodiments of Recommending Items to a Customer

Figure 10:
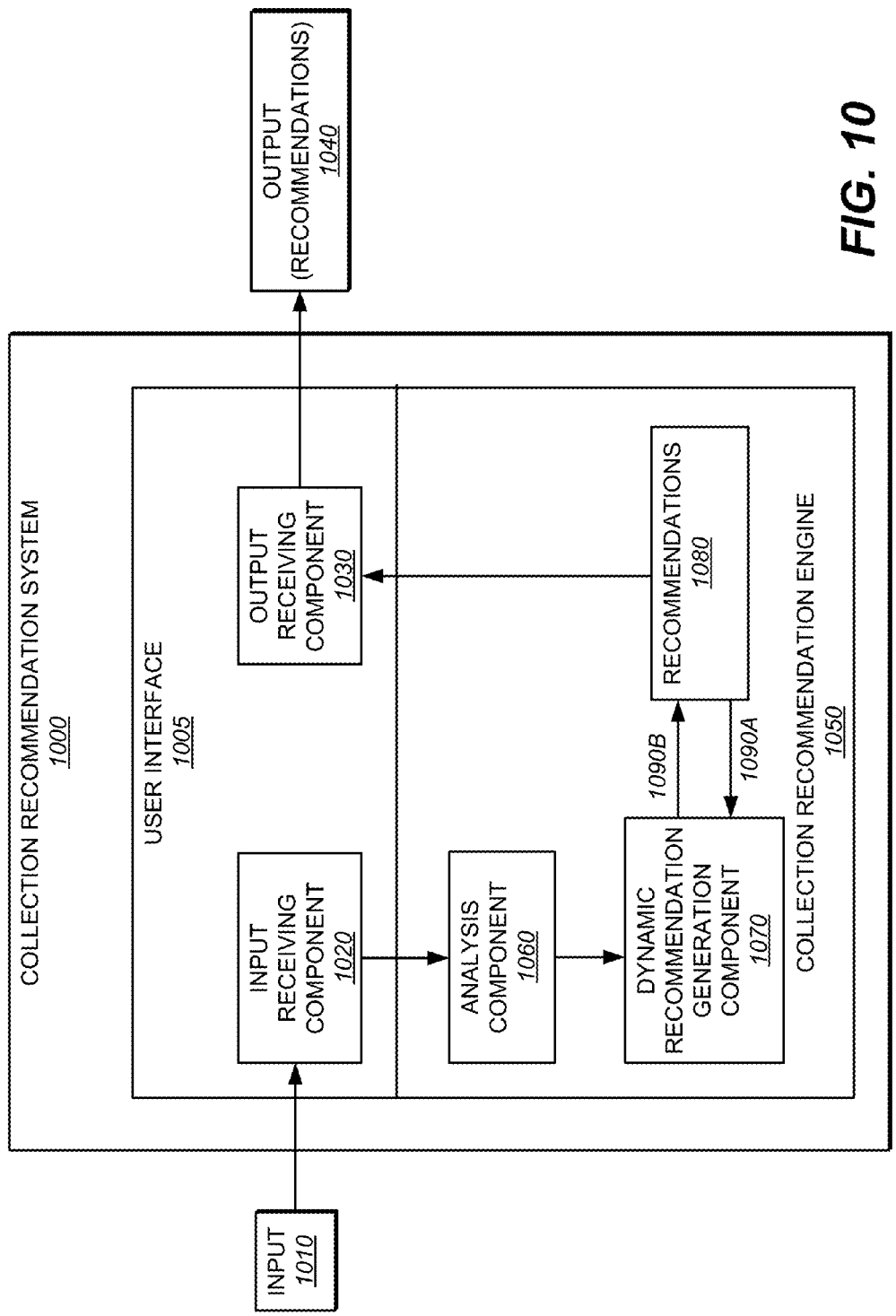
FIG. 10 depicts a block diagram that illustrates an embodiment of a collection recommendation system.

FIG. 10 depicts a block diagram of a collection recommendation system 1000, according to various embodiments. Collection recommendation system 1000 functions in conjunction with system 100 (see FIG. 1). In one embodiment, collection recommendation system 1000 is embedded in system 100.

The blocks that represent features in FIG. 10 can be arranged differently than as illustrated, and can implement additional or fewer features than what are described herein. Further, the features represented by the blocks in FIG. 10 can be combined in various ways.

According to one embodiment, a collection recommendation system 1000 is provided to a retailer where the collection recommendation system 1000 is for dynamically generating personalized recommendations 1040 for different customers of the retailer.

In one embodiment, collection recommendation system 1000 is configured to generate recommended retail items to a consumer, such as, but not limited to, suggested items 520 (as described above with respect to at least FIG. 5A). Accordingly, collection recommendation system 1000 generates personalized recommendations (e.g., suggested items 520) corresponding to an item in purchase basket 510.

As depicted, the collection recommendation system 1000 includes a user interface 1005 and a collection recommendation engine 1050. The user interface 1005 includes an input receiving component 1020 and an output providing component 1030. The collection recommendation system 1000 includes an analysis component 1060 and a dynamic recommendation generation component 1070.

The input receiving component 1020 is for receiving input 1010 that pertains to a customer. The analysis component 1060 is for analyzing the input 1010 that pertains to the customer. The dynamic recommendation generation component 1070 is for dynamically generating, based on the input 1010, a recommendation 4040 for the customer that includes a collection of coordinated items that provides a personalized ensemble. The output providing component 1030 is for providing the recommendation 1040 as output. The output 1040 can be one or more recommendations. The output 1040 can be a hierarchy of recommendations. The one or more recommendations 1040 can be displayed on a computer screen (e.g., display 162) or printed on paper, among other things.

According to one embodiment, the collection recommendation system 1000 provides a personalized ensemble to a consumer. For example, providing two customers with different recommendations that respectively include different collections when they express an interest in the same item. The personalized ensembles for each of the customers are provided by selecting items for the collections based on each of the respective inputs that pertain to the customers. Therefore, even though both of the respective customers' collections include an item A, one or more of the other items in their respective collections are different, according to one embodiment. The inputs that pertain to the customers can include any one or more of inputs from the retailer, more general customer inputs, finer grained customer inputs pertaining to customers' preferences on individual items, empirical data, and information about other customers that are similar to a customer. For example, the respective inputs associated with the respective customers can result in dynamically generating an ensemble that is personalized for the first customer that includes items A, B, C and D and dynamically generating an ensemble that is personalized for the second customer that includes items A, E, F and G.

The initial inputs 1010 to the collection recommendation system 1000 may include the inputs entered on a customer's account page, inputs from the retailer, more general customer inputs, empirical data, and information about other customers that are similar to a customer. One or more of the inputs 1010 are used to build correlation tables, according to one embodiment.

The dynamic recommendation generation component 1070 can receive the initial inputs 1010 and generate an initial combination based on the correlation tables and rules. According to one embodiment, the rules include constraints. An example of a rule is a violation of what would be considered proper style. For example, it is improper style to mix stripes and checks or to combine certain types of colors. In another example, different types of clothing look better on different shapes and sizes of bodies. More specifically, a tall athletic woman and a short woman with an hour glass figure look better in different types of clothing. A tall woman may look good wearing a jacket with large lapels whereas a short woman may look good wearing a jacket with a zipper down the front instead of lapels. A tall thin person may look good wearing horizontal stripes and a short person would look better wearing vertical stripes instead of horizontal stripes. According to one embodiment, types of collections with respectively associated categories of items can be used as a part of dynamically generating recommendations of personalized ensembles.

According to one embodiment, there is a feedback loop that enables subsequent recommendations to be dynamically generated based on subsequent inputs 1010 to the collection recommendation system 1000. For example, the collection recommendation system 1000 can iteratively generate subsequent recommendations in response to additional inputs 1010 that are received and re-rank the subsequent recommendations, as discussed herein. The subsequent recommendation for an iteration of the feedback loop may be the same as the previous recommendations, entirely different than the previous recommendations, or contain a subset of items or a subset of recommendation of the previous recommendations.

The subsequent inputs 1010 can be used to modify the correlation tables and the dynamic recommendation generation component 1070 can use the modified correlation tables and the rules as a part of dynamically generating subsequent recommendations.

Examples of subsequent inputs include finer grained customer inputs pertaining to customers' preferences on individual items, selections of alternative items, requests to generate a new collection, add to a collection, or suggest a collection, the customer's likes and dislikes, among other things. Further subsequent recommendations can be dynamically generated based on subsequent input from retailers, customer input whether general or fine grained, preferences on individual items, additional empirical data, additional information about other customers that are similar to the customer.

One or more of the recommendations 1040 are displayed, for example, for the customer to view. The recommendations 1040 may be a hierarchy of recommendations, as discussed herein.

Initially, the collection recommendation system 1000 can use a baseline of recommendations that have been provided, for example, by one or more retailers. For example, the collection recommendation system 1000 can receive input 1010 specifying a baseline of recommendations that are stored 1090b in the stored recommendations 1080. The base line of recommendations may be based on mannequin cards. With each iteration of dynamically generating recommendations and receiving additional inputs 1010 pertaining to the customer, the baseline recommendations can be replaced with recommendations that are personalized ensembles. For example, for each iteration, the previous recommendations are obtained 1090a from the stored recommendations, new recommendations are generated based at least in part on the previous recommendations and the previous recommendations are replaced by storing 1090b the newly generated recommendations in the stored recommendations 4080 in preparation for the next iteration. The output providing component 4030 can display the stored recommendations as output 1040 to the user. Over time, the baseline of recommendations can be replaced with recommendations that are personalized. According to one embodiment, the stored recommendations 1080 are re-prioritized for each iteration.

According to one embodiment, a user can upload a picture of an item that is not offered by a retailer (referred to herein as "non-retailer-offered item") and dynamically generate a recommendation that includes the item, where the items associated with the recommendation coordinate with the item and provide a personalized ensemble. For example, the user could take a picture or digital image of an item in their physical closet, an item in a magazine, an item of a friend, an item of a stranger, and upload that item. According to one embodiment, the non-retailer-offered item is not a part of the closet 1110c of the collection recommendation system 1000. According to one embodiment, the non-retailer-offered item can be added to the closet 1110c after the image of the non-retailer-offered item is received by the collection recommendation system.

According to one embodiment, an idea for a gift for a person other than the customer, such a friend of the customer, can be generated, for example, based on input or analyzed input. For example, as the customer collection recommendation system receives input and analyzes the input for a customer, it can build a profile and build a list of gift ideas for the customer's friend. The list could include items that complement items purchased by the customer or complement items purchased by other customers that are similar to the customer. The term "third party" can be used to describe the person that is other than the customer. The list of gift ideas could be used as automated wedding registry or party gift ideas that are highly relevant to the friend or third party.

According to one embodiment, a collection recommendation system is provided by a business (also referred to herein as a "system providing business") that has access to information for a multitude of retailers. Examples of retailers in the apparel industry are J. Crew, Talbot, and Macy's. According to one embodiment, the business is a credit card financing business that provides private labeled credit cards with different retailer labels for each of the retailers. For example, the business can provide a Macy's credit card for Macy's, a Talbot credit card for Talbot and a J. Crew credit card for J. Crew. The business obtains information about customers when they apply for the private labeled credit cards, such as one or more of their names, their email addresses, their ages, their incomes, where they live, how many children they own, their types of employment, the names of their businesses, among other things.

According to various embodiments, the collection recommendation system is provided for enhancing a retailer's revenue. There are various ways that the system providing business can in turn increase their revenues. The system providing business can increase their revenues by charging the retailers a fee for using or buying the collection recommendation system, according to one embodiment (also referred to as "fee based business model").

According to another embodiment, the system providing business's revenues are automatically increased due to the increase in customer purchases being charged to the private labeled credit cards that they issue for the retailers (also referred to as "no fee business model"). For example, the customers will see the collections and be motivated to purchase and charge more items on the private labeled credit cards. It is estimated that the collection recommendation system will increase the average purchases charged on the private labeled credit cards from 1.8 items to 2.3 items per transaction. The charging of more purchases on the private labeled credit cards results in more revenue for the system providing business, which issues the private labeled credit cards. In this case, neither the retailer nor the customer may be charged a fee for the collection recommendation system.

According to another embodiment, a combination business model can be used that is a combination of the fee based business model and the no fee business model.

According to various embodiments, input that pertains to a customer can be received by the collection recommendation system. Examples of the input are inputs from the retailer, more general customer inputs, finer grained customer inputs pertaining to customers' preferences on individual items, empirical data, and information about other customers that are similar to a customer.

Examples of inputs from the retailer include management cards. Examples of management cards are the combinations of items that may appear in catalogs or that may be used to dress mannequins in stores (also referred to as "mannequin cards").

Examples of the more general customer inputs include, among other things, their personal information, the individuals or groups the customer is interested in sharing information with, social media, and their more general preferences. Examples of personal information include their names, their size information, their birth date, and their anniversary. Their more general preferences include the colors and styles that they prefer. In various illustrations, a customer can indicate their color and style preferences on the my account page, according to one embodiment.

Examples of finer grained customer inputs include feedback from the customers as to individual items that they like and individual items that they dislike. For example, the customer may indicate that they like item A and that they dislike item B. The finer grained customer inputs may be binary like or dislike. The finer grained customer inputs may include a prioritization of their likes and dislikes of individual items. For example, the customer may indicate that they dislike both items A and B but that they dislike B more than A. Further, the customer may indicate that they like both items C and D and that they like item C more than item D. In various illustrations, a customer can indicate that they like or dislike something using the respective like icons or dislike icons.

Examples of empirical data include demographic information and purchase history about the customer. Examples of demographic information include name, email address, age, income, location of residence, number of children, type of employment, and name or type of business. Examples of purchase history include category of item purchased, price of the item purchased, date of purchase, location of purchase, and retailer the item was purchased from.

Information about other customers includes demographic information or purchase history, or a combination thereof, for other customers that are similar to that customer.

According to various embodiments, a system providing business may have relationships with, for example, hundreds of retailers, where each retailer may have one, two or more brands. The system providing business may also have relationships with several million households and over a hundred years of preference history providing a vast amount of input pertaining to a customer for the system providing business to utilize.

Figure 11:
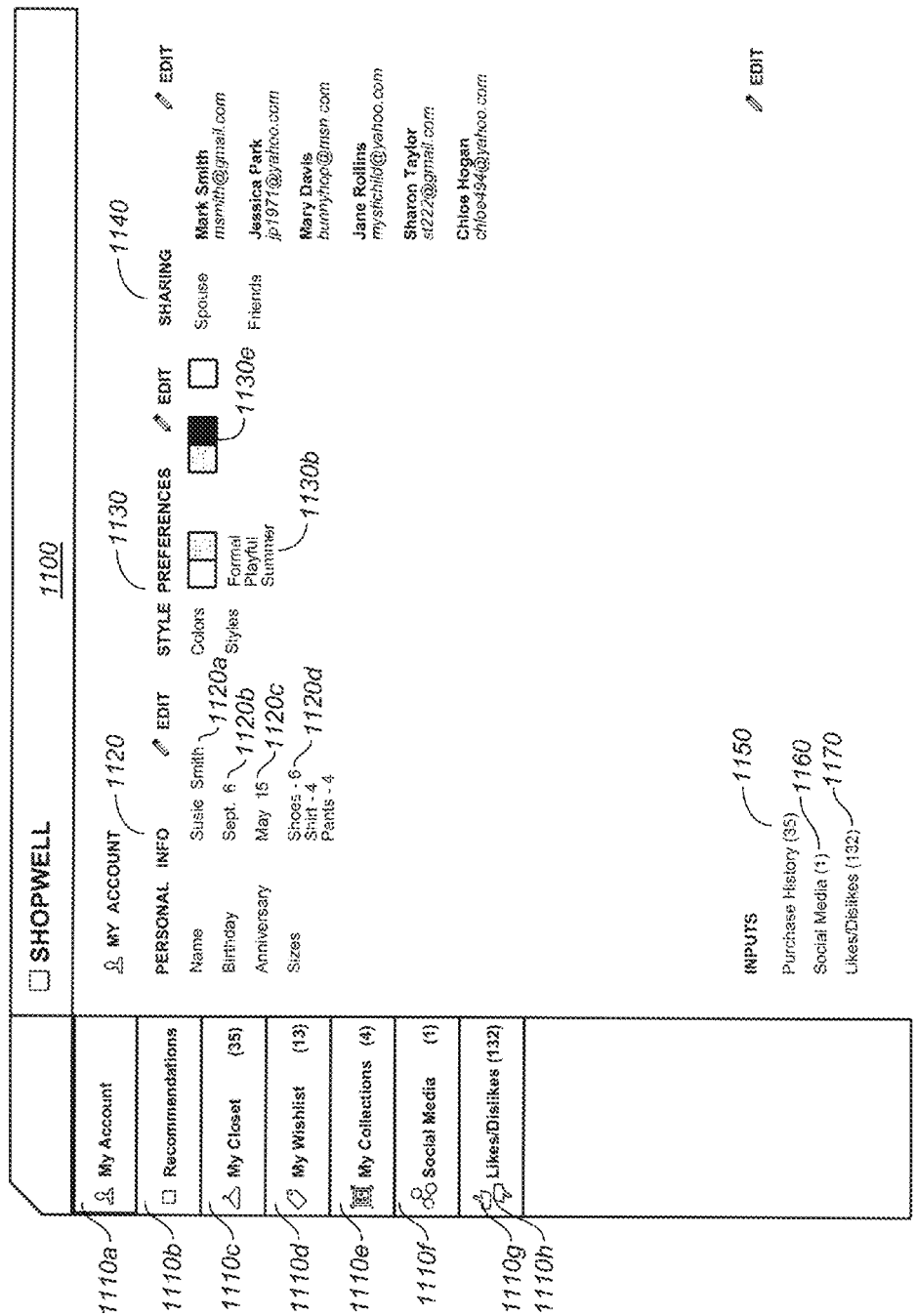
FIG. 11 depicts a block diagram that illustrates an embodiment of a page for the customer's account information.

FIG. 11 depicts a page 1100 for the customer's account information, according to one embodiment.

According to one embodiment, the page 1100 depicts the various pieces of customer's input. Examples of the customer's input include personal information 1120, preferences 1130, individuals or groups 1140 the customer is interested in sharing information with, purchase history 1150, social media 1160, and likes and dislikes 1170.

According to one embodiment, the customer can share the items that are in their wishlist with the individuals or groups 1140. For example, by sharing their wish list with individuals or groups 1140, the people associated with 1140 may purchase items for the customer from the customer's wish list.

Examples of personal information 1120 are the customer's name 1120a, birth date 1120b, wedding anniversary 1120c, and sizes 1120d of various types of apparel, such as shoe, shirt, pants, and dress, among others. According to one embodiment, the personal information 1120 can include one or more measurements of parts of a customer's body, such as height, chest, waist, hips, inseam of their leg, neck, and arm length, among others.

Examples of preferences 1130 are preferred colors 1130a and preferred styles 1130b. In this example, the colors 1130a include dark blue, hunter green, light green, yellow, burnt orange, teal, tan, and chocolate brown and the styles 1130b include formal, playful, and summer.

The page 1100 has tabs 1110a-1110h on the side for accessing various pages of the user interface, such as the customer's account 1110a (e.g., "My Account"), recommendations 1110b of collections for the customer (e.g., "Recommendations"), the customer's closet 1110c (e.g. "My Closet"), the customer's wish list 1110d of items they desire to purchase (e.g., My Wishlist"), the customer's collections 1110e (e.g., "My Collections"), the customer's social media 1110f (e.g., "Social Media"), and the customer's likes 1110g (e.g., "Likes") and dislikes 1110h (e.g., "Dislikes") of specific items. The like tab 1110g can be displayed as a thumbs up and the dislike tab 1110h can be displayed as a thumbs down, according to one embodiment. According to one embodiment, the customer's collections under the collection tab are collections that were recommended using the recommendation tab 1110b and that the customer has accepted to become a part of their collections. The my account tab 1110a is highlighted, according to one embodiment, because the customer selected it.

As depicted, there are 35 items in the customer's closet 1110c, 13 items in the customer's wish list 1110d, four collections 1110e for the customer, one social media 1110f, which in this illustration is Facebook, the customer has specified 132 likes and dislikes of specific items for tab 1110g, and there are 35 items in the purchase history 650. Closet 1110c, in one embodiment, is purchase basket 510.

Figure 12:
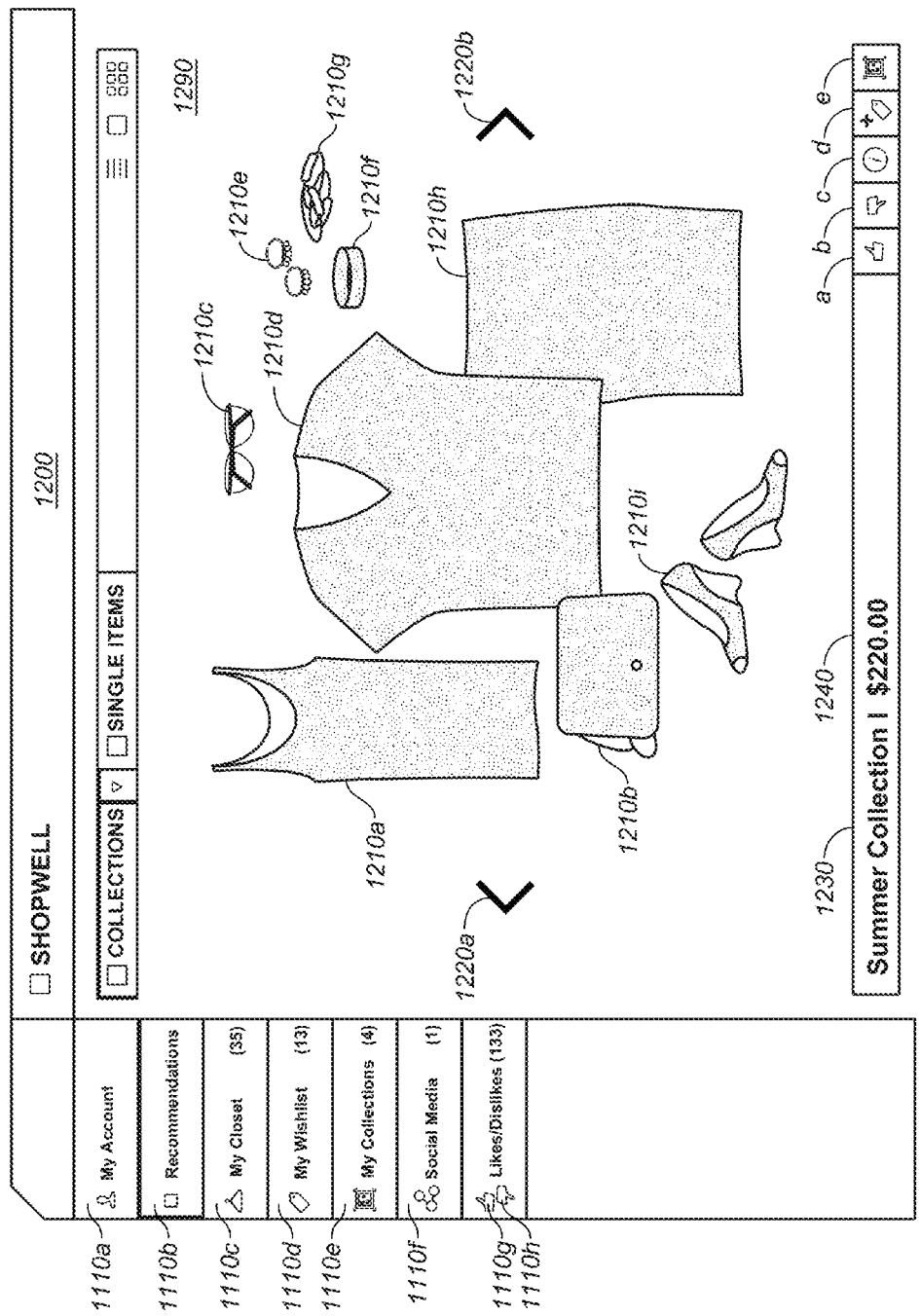
FIG. 12 depicts a block diagram that illustrates an embodiment of a page of a ranked recommendation.

FIG. 12 depicts a page 1200 with the highest ranked recommendation 1290 for the customer, according to one embodiment. In one embodiment, the highest ranked recommendation 1290 corresponds to an item selected in purchase basket 510.

The recommendations of collections are ranked based on potential appeal to the customer. The recommendation that potentially has the highest appeal to the customer is the highest ranked recommendation and can be displayed first, according to one embodiment.

The collection is a dynamically generated recommendation 1290 for a customer that includes coordinated items 1210a-i that provides a personalized ensemble for the customer. For example, the depicted collection on FIG. 12 includes a tank top 1210a, a horizontal striped shirt 1210d that could be worn over the tank top, a skirt 1210h, a pair of shoes 1210i, sunglasses 1210c, and jewelry, such as a pair of ear rings 1210e, and bracelets 1210f, 1210g. The tank top 1210a and shoes 1210i are black. The horizontal striped shirt 1210d has white and black horizontal stripes. The skirt 1210h, purse 1210b, the wide bracelet 1210f and the ear rings 1210e are teal with the skirt 1210h and ear rings 1210e being a darker shade of teal than the purse 1210b and wide bracelet 1210f. The thin bracelets 1210g have a gold finish. The sunglasses 1210c have a tortoise shell rim. This is just one example of a generated recommendation that provides a personalized ensemble.

The page 1200 can indicate the style 1230 and price 1240 of the recommendation 1290. In this illustration, the collection is a summer collection and costs $220.00. According to one embodiment, the collection correlates with one of the styles that the customer indicated that they prefer, for example, in a style preference page or the like.

The items 1210a-i in the collection complements each other and provides a coordinated personalized ensemble for the customer. The personalized ensemble can be provided based on the input that pertains to the customer, according to one embodiment. For example, one of the customer's style preferences 1130b (FIG. 11) is summer and the collection includes items for summer style 1230. In another example, the customer's preferred colors 1130a (FIG. 11) include teal and the collection has items of various shades of teal that coordinate with each other. In a third example, the items of the collection are selected to conform to the customer's specified sizes 1120d (FIG. 11). These are just a few examples of the input that pertains to the customer that can be used for dynamically generating a recommendation 1290 that is a personalized ensemble.

The page 1200 depicted on FIG. 12 displays various tabs 1110a-1110h on the left side, as discussed herein. The recommendations tab 1110b is highlighted because the customer selected it.

The page 1200 depicted on FIG. 12 displays various icons a-e, such as a like icon a, a dislike icon b, an information icon c, a wish list icon d, and collection icon e. These icons a-e are associated with any one or more pages or pop-up windows as depicted on various pages of the collection recommendation system's user interface, as will become more evident. According to one embodiment, a like icon a may be displayed as a thumbs up, a dislike icon b may be displayed as a thumbs down, the information icon c may be displayed as the letter i inside of a circle, the wish list icon d may be displayed as a plus sign, and the collection icon e may approximate a square.

Page 1200, according to one embodiment, has respective arrows 1220a, 1220b to enable a user to flip to a previous page or the next page.

Figure 13:
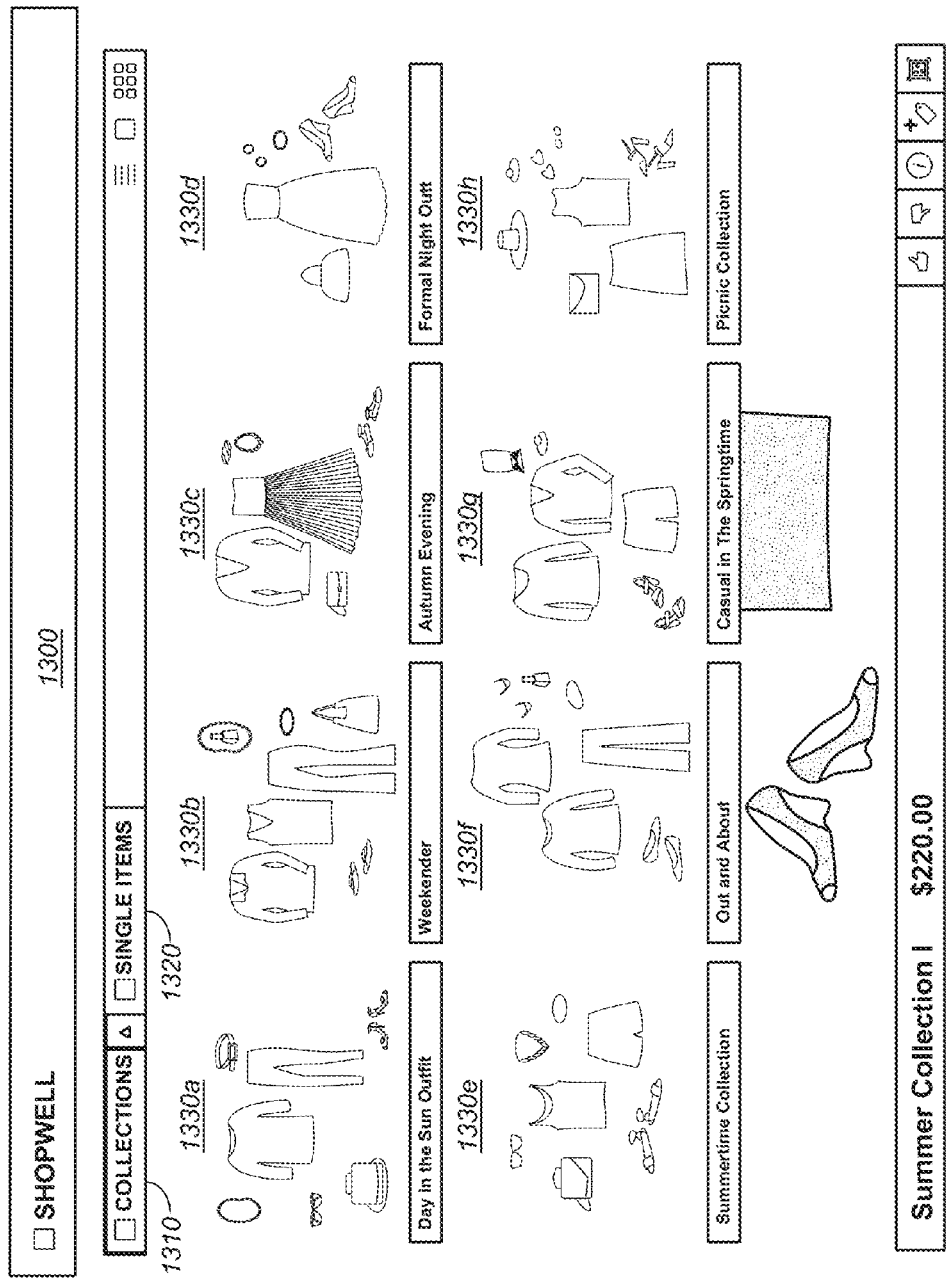
FIG. 13 depicts a block diagram that illustrates an embodiment of a page of various recommendations of collections for the customer.

FIG. 13 depicts a page 1300 with more recommendations of collections for the customer, according to one embodiment. FIG. 13 depicts two options 1310 and 1320. One for displaying collections 1310 and the other for displaying single items 1320. The collections option 1310 is highlighted because the customer selected it.

The recommendations of collections form a recommendation hierarchy of recommendations that were dynamically generated based on the input that pertains to the customer where each recommendation provides a collection of coordinated items that provides a personalized ensemble. The recommendations in the hierarchy are ranked based on potential appeal to the customer. For example, a recommendation 1190 that potentially has the highest appeal to the customer was already displayed to the customer on FIG. 11. The lower ranked recommendations are displayed on FIG. 13 and are ordered according to their rank from second highest to the lowest, for example starting at the upper left corner and proceeding to the lower right corner. More specifically, as depicted in FIG. 13, the recommendations are ranked from second highest to the lowest 1330a-1330h.

For example, if a customer selects recommendation 1330a, then the items in recommendation 1330a are depicted on a single page for viewing and selection by a customer. Similarly, if a customer selects any of the recommendation 1330a-1330h, then the items in the selected recommendation are depicted on a single page for viewing and selection by a customer.

Assume in this illustration, that the customer clicked on the pair of shoes from recommendation 1330c because they liked the shoes or they want more information about the shoes. In response, a pop up window is generated that includes an expanded view of the shoes that the customer selected. The pop up window can display the price of the shoes and various icons a-e.

Figure 14:
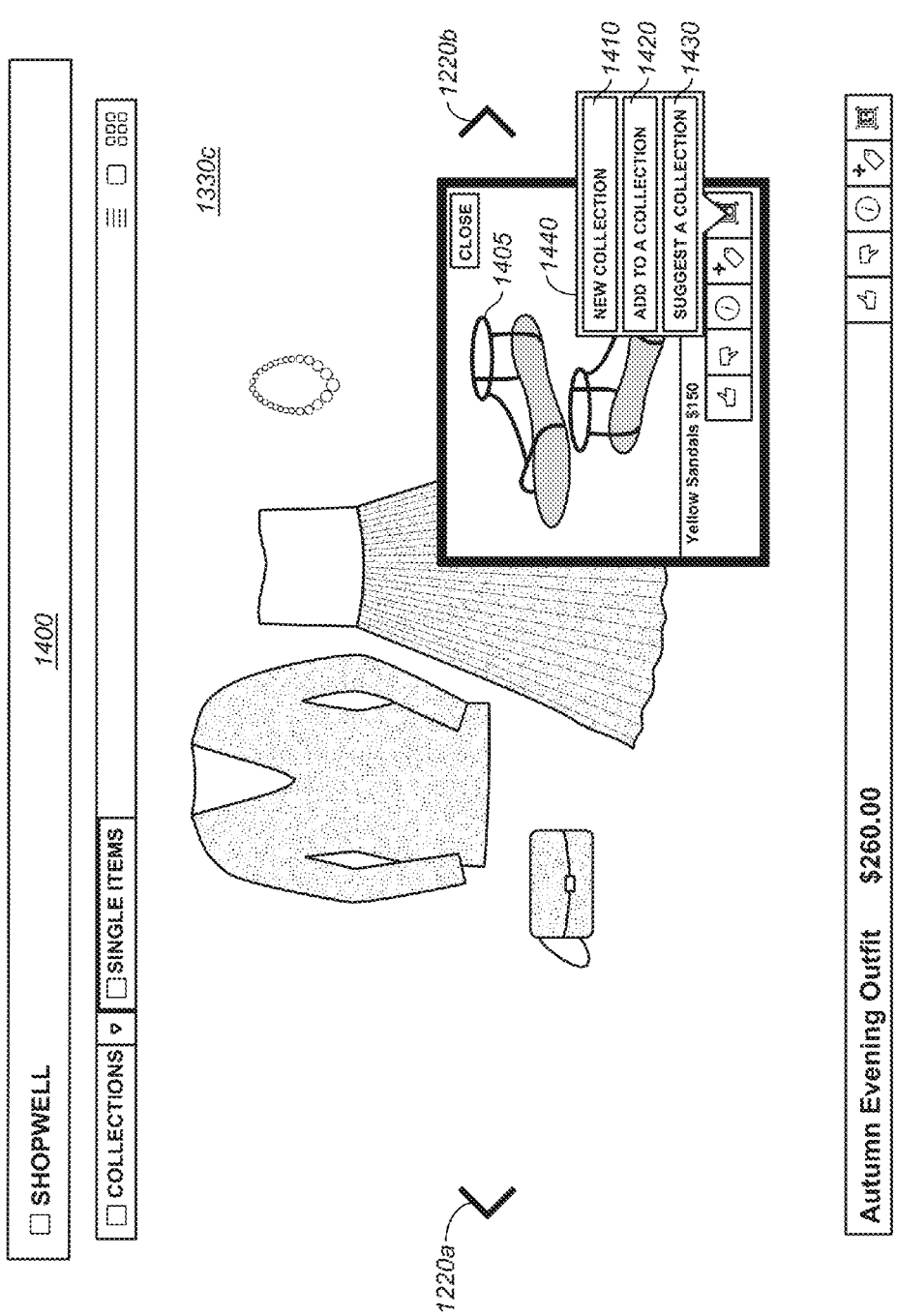
FIG. 14 depicts a block diagram that illustrates an embodiment of a page of a recommendation.

FIG. 14 depicts a page 1400 with more recommendations of collections for the customer, according to one embodiment. Assume in this illustration, that the customer clicked on the collection icon e in the pop up window. In response, a menu 1440 can be displayed with options for new collection 1410, add to collection 1420 and suggest a collection 1430. According to one embodiment, the new collection option 1410 is for creating a new collection that includes the shoes 1405, the add to a collection option 1420 for adding these shoes 1310 to an existing collection, and suggest a collection option 1430 for suggesting a collection with these shoes 1405. These are just a few examples of options.

Figure 15:
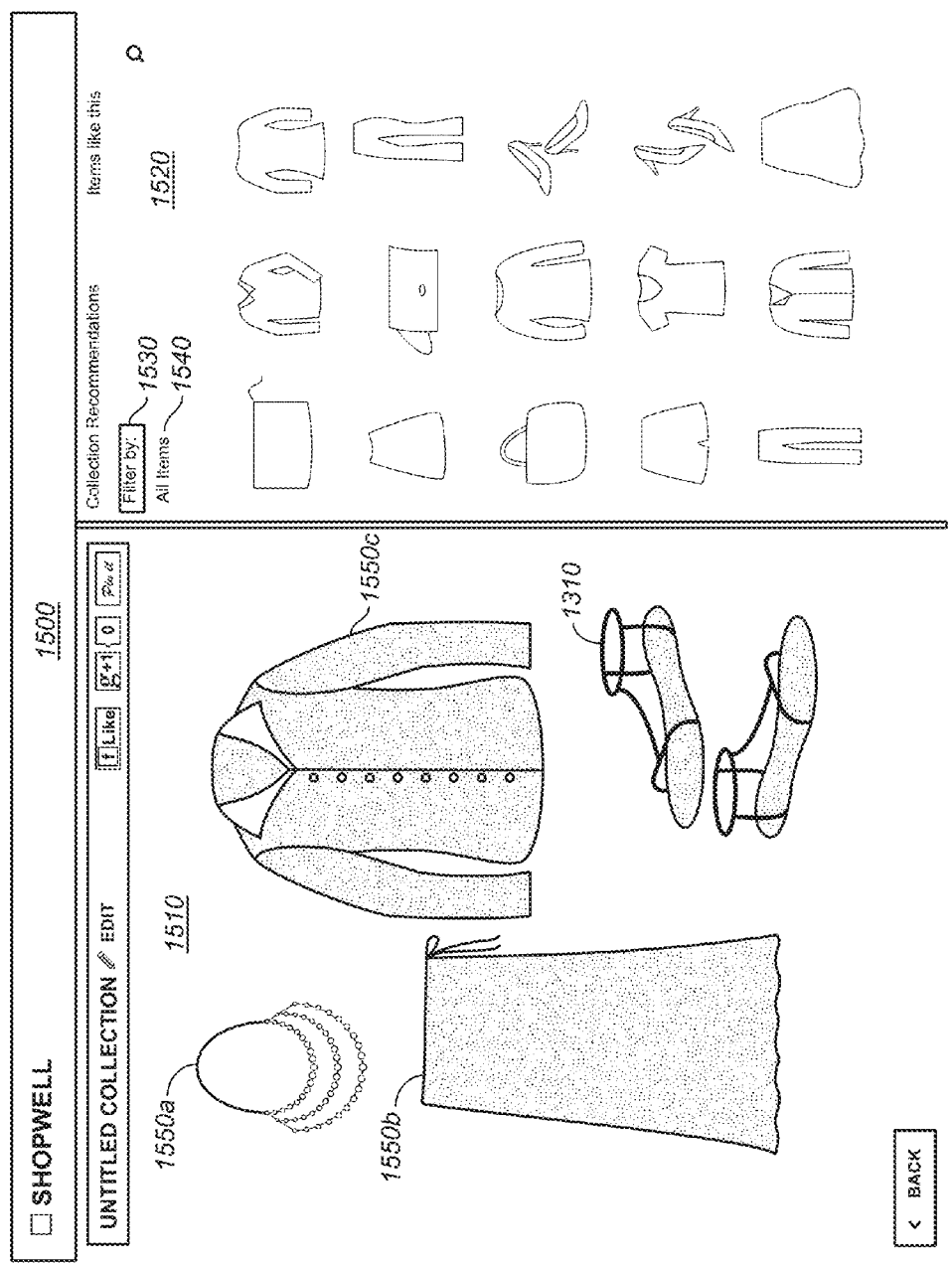
FIG. 15 depicts a block diagram that illustrates an embodiment of a page of a recommendation.

Assume in this illustration, that the customer selected the suggest a collection option 1430. In response, FIG. 15 can be displayed, according to one embodiment. FIG. 15 depicts a page 1500 with a suggested collection that includes the shoes 1310 the customer showed an interest in. In this illustration, the suggested collection includes the yellow shoes 1310, a pale blue long sleeved button down shirt 1550c, a dark blue calf length draw string loose fitting skirt 1550b, and a necklace 1550a with four strands of beads that vary in color from dark blue to light blue to coordinate with the light blue shirt 1550c and the dark blue skirt 1550b. Various embodiments are well suited for suggested recommendations that include other items. The suggested collection is depicted on a first portion 1510 of the page 1500. Additional suggestions of items that the customer may be interested in viewing in combination with the yellow shoes 1310 are depicted on a second portion 1520 of the page

1500. As depicted, the first portion 1510 is on one side of the page 1500 and the second portion 1520 is on the other side of the page 1500. Various embodiments are well suited for other arrangements of components on the page 1500.

According to one embodiment, the page 1500 provides a drop down menu 1530 that allows the customer to choose a filter that determines the categories of items displayed in the second portion 1520. As depicted, the selected filter is for all items 1540. Therefore, the second portion 1520 of the page 1500 displays items that various categories, such as price, color, shirts, pants, dresses, shoes, handbags, coats, ties, jackets, sweaters, and accessories.

Figure 16:
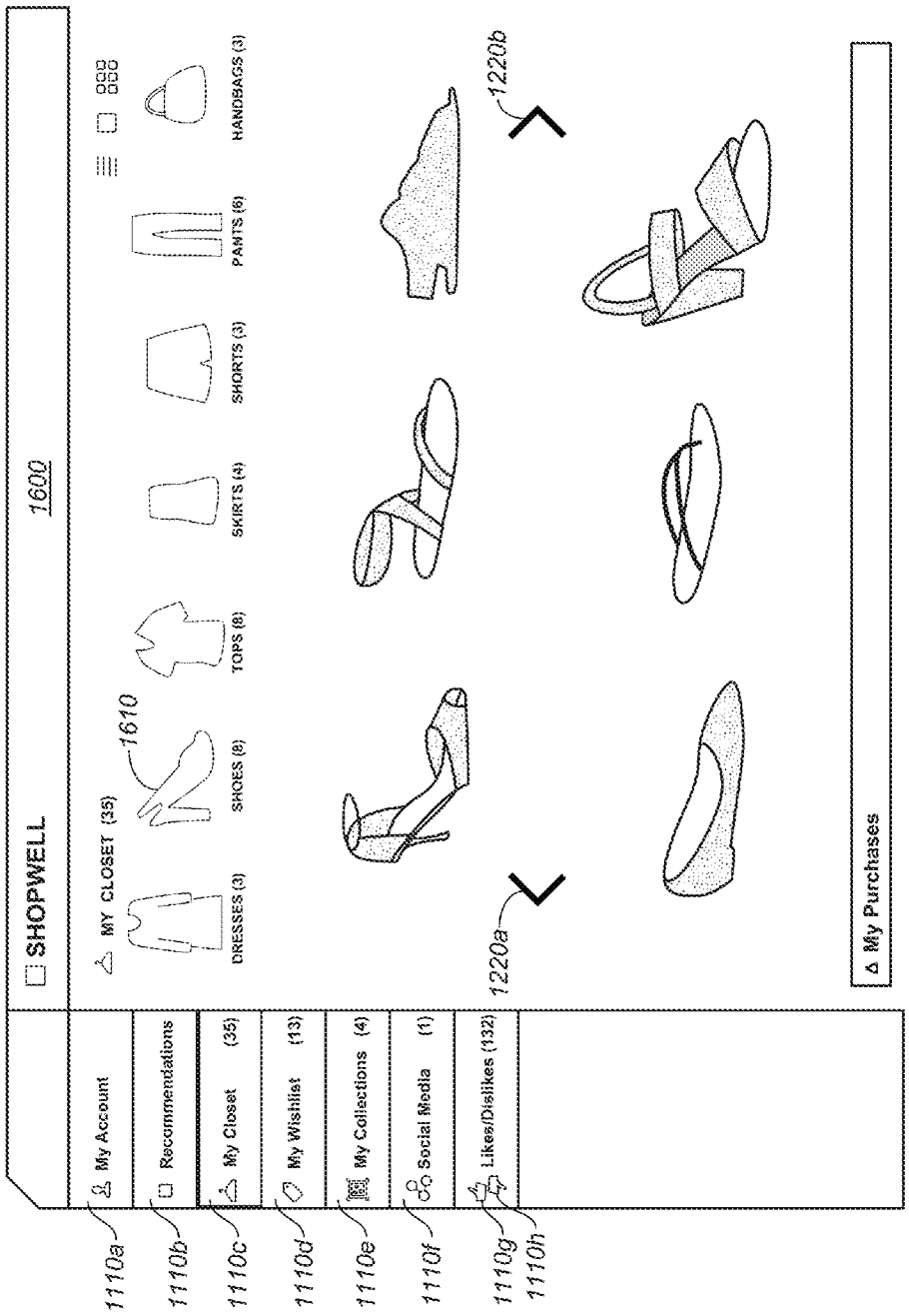
FIG. 16 depicts a block diagram that illustrates an embodiment of a page of a recommendation.

FIG. 16 depicts a page 1600 with the shoes that are in the customer's closet. The page 1600 depicted on FIG. 16 displays various tabs 1110a-1110h on the left side. The tab for my closet 1110c is highlighted because the customer selected it.

According to one embodiment, the customer's closet includes the items of apparel that they have purchased, for example, from one or more retailers that use the collection recommendation system. At the top of the page are icons that represent various types of items in their closet such as the dresses, the shoes, the tops, the skirts, the shorts, the pants and the handbags. The page 1600 indicates that there is a total of 35 items in their closet with 3 dresses, 8 shoes, 8 tops, 4 skirts, 3 shorts, 6 pants, and 3 handbags. Since the customer is interested in the shoes in their closet, the shoe icon 1610 at the top is highlighted. A subset of all of the items in a category can be displayed. For example, the page 1600 depicts 6 of the 8 shoes that are in their closet.

Assume that the customer decides to filter on price and color. In response, a page 1700 as depicted in FIG. 17 can be displayed.

According to one embodiment, different types of collections can include items for different categories. For example, one type of collection may include items for the categories dress, shoes, purse, jewelry, purse. Another type of collection may include items for the categories pants, shoes, scarf, jewelry, and purse. Yet another type of collection may include items for the categories pants, shirt, jacket and tie. According to one embodiment, icons that represent the categories associated with the respective type of collection to facilitate associating items with the collection for the appropriate categories. According to one embodiment, the collection recommendation system automatically determines categories to associate with a type collection. For example, the collection recommendation system may use the specified preferences to determine categories to associate with a type collection. According to one embodiment, a user of the collection recommendation system can determine what categories to associate with a type collection. In another example, the collection recommendation system may initially suggest the categories to associate with a type collection and a user can modify the categories associated with a type of collection. The collection recommendation system can dynamically generate a personalized ensemble using the categories associated with a type of collection. For example, if that type of collection has categories of dress, shoes, purse, jewelry and a scarf, the collection recommendation system can use various inputs to dynamically generate items for dress, shoes, purse, jewelry and a scarf for that type of collection and rank the dynamically generated collection recommendation as discussed herein.

Figure 17:
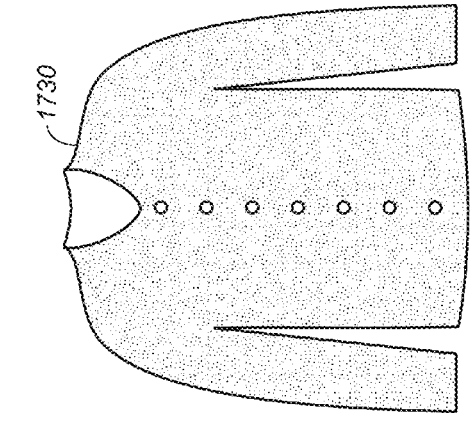
FIG. 17 depicts a block diagram that illustrates an embodiment of a page of a recommendation.

FIG. 17 depicts the green sweater 1730, the item category icons 1730a-1730e, a plurality of price ranges 1740, colors 1750, and various items that may be organized according to category 1730a-1730e. The page 1700 has a first portion 1710 and a second portion 1720. The green sweater 1730 and the item category icons 1730a-1730e are displayed in the first portion 1710. According to one embodiment, the first portion 1710 is to one side of the page 1700 and the second portion 1720 is on the other side of the page 1700. The plurality of price ranges, colors, and various items that satisfy the one or more filters (e.g., 1740 and 1750) are displayed in the second portion 1720. Various embodiments are well suited to using different organizations for displaying the portions 1710, 1720 and the various components on the page 1700.

The range of prices 1740 in this illustration include under $50, $50-$100, $100-$250, $500-$1000, over $1000. The colors 1750 include or compliment, or a combination thereof, the colors included in a customer's specified preferred colors. As depicted on FIG. 17, the customer selected the $100-$250 range and hunter green. According to one embodiment, the selections are indicated by annotating a corner of the block that the customer selected. For example, the block 1740a that represents the $100-$250 range and the block 1750a that represents hunter green are both annotated in this example. The various items that are depicted in the second portion 1720, according to one embodiment, are grouped according to categories. For example, items, such as tops and outerwear, that would be worn on the upper body are grouped, items, such as dresses, that would be worn on the upper body and at least part of the lower body, are grouped, items worn on the lower body, such as jeans, pants, skirts and shorts, are grouped, items worn on the feet, such as shoes, are grouped, the accessories, such as bags, hats, and jewelry are grouped. The customer can complete the collection with the green sweater, for example, by selecting items for each of the categories displayed in the second portion 1720.

Example Methods of Operation

Figure 18:
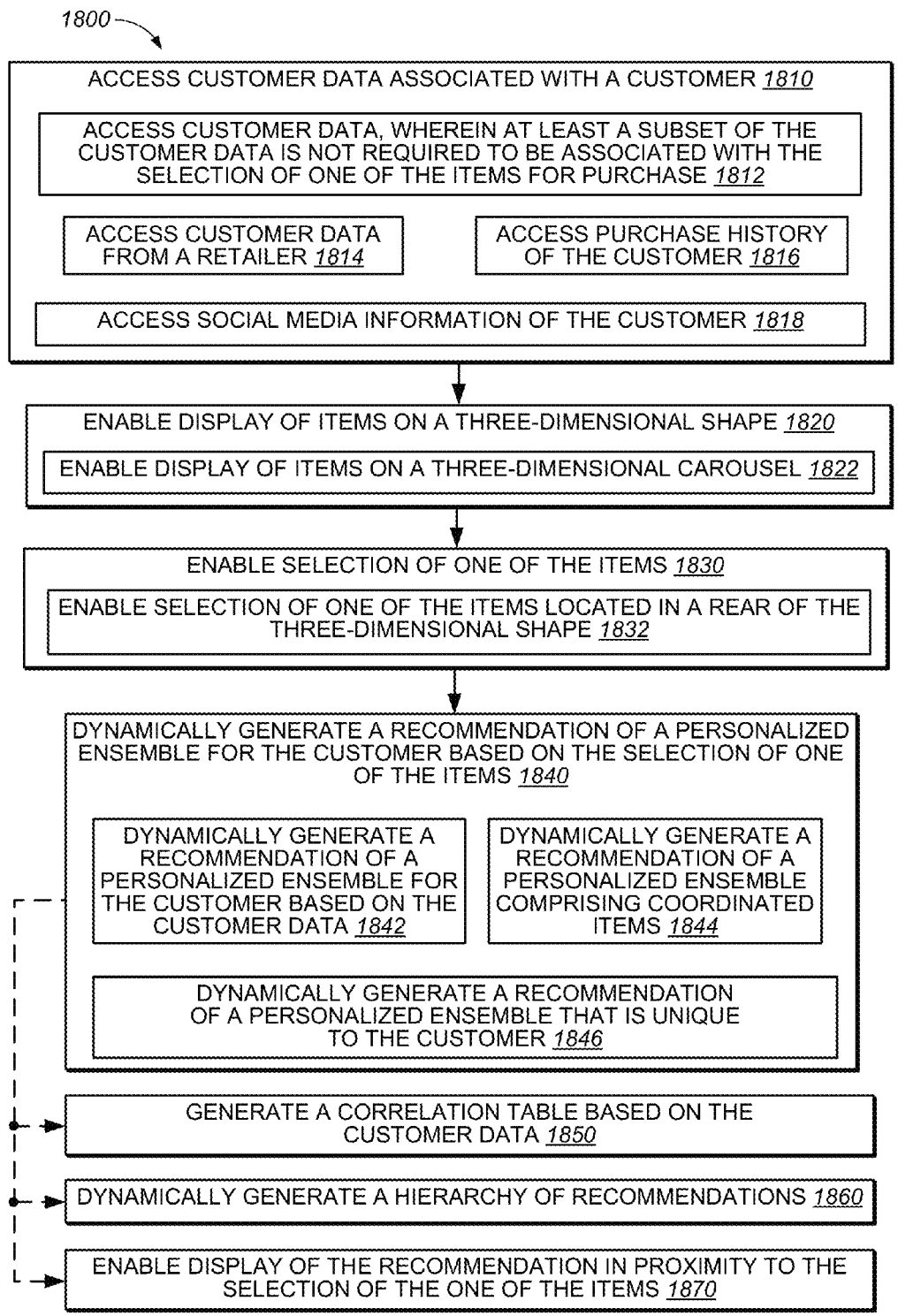
FIG. 18 depicts a flow diagram for a method for generating a recommendation of a personalized ensemble, accordingly to various embodiments.
Figure 19:
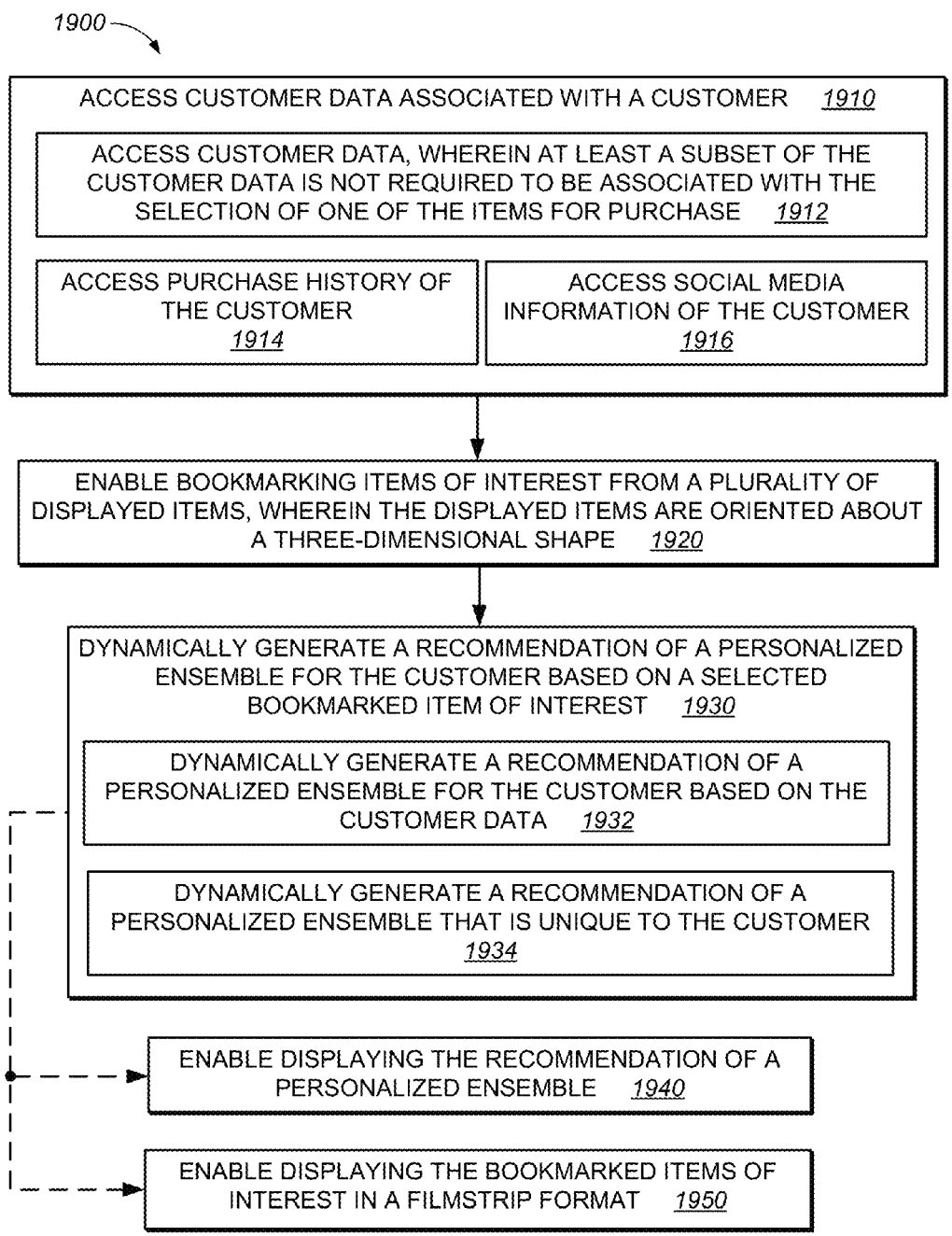
FIG. 19 depicts a flow diagram for a method for generating a recommendation of a personalized ensemble, accordingly to various embodiments.

The following discussion sets forth in detail the operation of some example methods of operation of embodiments. With reference to FIGS. 18 and 19, flow diagrams 1800 and 1900 illustrate example procedures used by various embodiments. Flow diagrams 1800 and 1900 include some procedures that, in various embodiments, are carried out by a processor under the control of computer-readable and computer-executable instructions. In this fashion, procedures described herein and in conjunction with flow diagrams 1800 and 1900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. device 160, system 110, and/or system 1000). The computer-readable and computer-executable instructions, which reside on tangible computer readable storage media, are used to control or operate in conjunction with, for example, one or some combination of processors of the computer environments. It is appreciated that the processor(s) may be physical or virtual or some combination (it should also be appreciated that a virtual processor is implemented on physical hardware). Although specific procedures are disclosed in flow diagrams 1800 and 1900, such procedures are examples. That is, embodiments are well suited to performing various other procedures or variations of the procedures recited in flow diagrams 1800 and 1900.

Likewise, in some embodiments, the procedures in flow diagrams 1800 and 1900 may be performed in an order different than presented and/or not all of the procedures described in one or more of these flow diagrams may be performed. It is further appreciated that procedures described in flow diagrams 1800 and 1900 may be implemented in hardware, or a combination of hardware with firmware and/or software.

FIG. 18 depicts a flow diagram for a method for generating a recommendation of a personalized ensemble, according to various embodiments.

Referring now to FIG. 18, at 1810, customer data associated with a customer is accessed. For example, input receiving component 1020 receives input 1010. Input 1010 may be any data that pertains to a customer (e.g., real or hypothetical). In one example, input 1010 is an image of an actual item provided by the customer. Various examples of input 1010, can be but is not limited to, personal information, past purchase information, etc.

At 1812, customer data is accessed, wherein at least a subset of the customer data is not required to be associated with the selection of one of the items for purchase. For example, a customer selects an item to potentially purchase. Accordingly, the recommendation of a personalized ensemble pertaining to the selected item is based on information other than the actual selection of the item. For instance, the subset of customer data can be, but is not limited to, past purchasing history, physical attributes, etc.

At 1814, customer data is accessed from a retailer. For example, input 1010 provided by a retailer can be, past purchases, past item returns, cost of purchased items, etc.

At 1816, purchase history of the customer is accessed. For example, types of clothing, dates of purchase, amount of purchases are accessed.

At 1818, social media information of the customer is accessed. For example, social media sites such as Facebook, Pinterest, and the like, may provide information that facilitates in providing a recommendation of a personal ensemble.

At 1820, displaying of items on a three-dimensional shape is enabled. For example, display module 120 automatically provides display instructions for displaying items and/or tags of the items. In particular, images located to the rear of the 3-D object are visible such that they are able to be viewed and selected, even if disposed at least partially behind other images.

At 1822, displaying of items on a three-dimensional carousel is enabled. For instance, 3-D object 310 is a carousel. As such, the images displayed about a 3-D carousel.

At 1830, selection of one of the items is enabled. For example, any of items that are displayed to a customer may be selected by a customer because the customer is interested in purchasing the selected item.

At 1832, selection of one of the items located in a rear of the three-dimensional shape is enabled. For example, all of the items that are displayed around the 3-D object are able to be selected by a customer. In particular, the items that are located near the rear of the 3-D object, even if partially disposed behind other images, are able to be selected by a customer.

At 1840, a recommendation of a personalized ensemble is dynamically generated for the customer based on the selection of one of the items. For example, collection recommendation engine 1050 dynamically generates a personal ensemble (e.g., page 1200) in response to a user selecting an item of interest, such as a bookmarked item.

At 1842, a recommendation of a personalized ensemble is dynamically generated for the customer based on the customer data. For example, collection recommendation engine 1050 receives customer specific data (e.g., physical attributes, past purchase history, etc.) and generates a personalized ensemble based on the customer specific data.

At 1844, a recommendation of a personalized ensemble is dynamically generated comprising coordinated items. For example, the depicted collection on FIG. 12 includes a plurality of coordinated items such as, a tank top 1210*a*, a horizontal striped shirt 1210*d* that could be worn over the tank top, a skirt 1210*h*, a pair of shoes 1210*i*, sunglasses 1210*c*, and jewelry, such as a pair of ear rings 1210*e*, and bracelets 1210*f*, 1210*g*.

At 1846, a recommendation of a personalized ensemble is dynamically generated that is unique to the customer. For example, if a two customer selected the same bookmarked item for purchase, the customers would not receive the same personalized recommendation associated with the selected bookmarked item.

At 1850, a correlation table is generated based on the customer data. For example, inputs 1010 are used to build correlation tables. The dynamic recommendation generation component 1070 can receive the initial inputs 1010 and generate an initial combination based on the correlation tables and rules.

At 1860, dynamically generate a hierarchy of recommendations. For example, page 1300 depicts hierarchy of recommendations that were dynamically generated based on the input that pertains to the customer where each recommendation provides a collection of coordinated items that provides a personalized ensemble. The recommendations in the hierarchy are ranked based on potential appeal to the customer.

At 1870, the recommendations are enabled to be displayed in proximity to the selection of the one of the items. For example, suggested items 520 (e.g., recommendation 1290) are displayed proximate to a selected item in purchase basket 510.

FIG. 19 depicts a flow diagram for a method for generating a recommendation of a personalized ensemble, according to various embodiments.

Referring now to FIG. 19, at 1910, customer data associated with a customer is accessed. For example, input receiving component 1020 receives input 1010. Input 1010 may be any data that pertains to a customer (e.g., personal information, past purchase information, etc.).

At 1912, customer data is accessed, wherein at least a subset of the customer data is not required to be associated with the selection of one of the items for purchase. For example, a customer selects an item to purchase. Accordingly, the recommendation of a personalized ensemble pertaining to the selected item is based on information other than the actual selection of the item. For instance, the subset of customer data can be, but is not limited to, past purchasing history, physical attributes, etc.

At 1914, past purchasing history is accessed. For example, input 1010 provided by a retailer can be, past purchases, past item returns, cost of purchased items, etc.

At 1916, social media information of the customer is accessed. For example, social media sites such as Facebook, Pinterest, and the like, may provide information that facilitates in providing a recommendation of a personal ensemble.

At 1920, bookmarking items of interest from a plurality of displayed items is enabled, wherein the displayed items are oriented about a three-dimensional shape. For example, items displayed with respect to 3-D object 310 are able to be bookmarked for subsequent viewing by the customer At 1930, a recommendation of a personalized ensemble is dynamically generated for the customer based on a selected bookmarked item of interest. For example, collection recommendation engine 1050 dynamically generates a personal ensemble (e.g., page 1200) in response to a user selecting a bookmarked item.

At 1932, a recommendation of a personalized ensemble is dynamically generated for the customer based on the customer data. For example, collection recommendation engine 1050 receives customer specific data (e.g., physical attributes, past purchase history, etc.) and generates a personalized ensemble based on the customer specific data.

At 1934, a recommendation of a personalized ensemble is dynamically generated that is unique to the customer. For example, if a two customer selected the same bookmarked item for purchase, the customers receive different personalized recommendations associated with the selected bookmarked item.

At 1940, the recommendation of a personalized ensemble is enabled to be displayed. For example, device 160 is able to display page 1200 to a customer.

At 1950, the bookmarked items of interest are enabled to be displayed in a filmstrip format. For example, device 160 is able to display bookmarked items in filmstrip 420.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

What is claimed is:

1. A computer-implemented method for generating a recommendation of a personalized ensemble, said computer-implemented method comprising:
   accessing, by a computer system, customer data associated with a customer to achieve accessed customer data;
   accessing, by said computer system, rules, wherein said rules comprise a set of constraints pertaining to valid and invalid combinations of retail items, wherein said retail items have tags that describe respective retail items, and wherein said tags comprise subsets of tags;
   determining, by said computer system, a quantity of two-dimensional images that can be displayed in a single view on a display of the computer system;
   assigning the quantity of two-dimensional images as a predetermined threshold number;
   reducing, by said computer system, said subsets of tags from a first number to said predetermined threshold number
      said first number of tags being a number of all tags fitting a particular descriptor,
      said reducing said subsets of tags to said predetermined threshold number by continuing to add additional descriptors to further narrow said first number of tags until less than said predetermined threshold number is reached;
   displaying, on a display screen of said computer system, a plurality of two-dimensional images corresponding to said reduced subset of tags associated with said retail items, wherein said plurality of two-dimensional images are scrollable around an outer surface of an unrendered three-dimensional sphere, wherein each of said plurality of two-dimensional images can be rotated concurrently in any direction about a center point of said sphere;
   receiving, by said computer system, a selection of one of said plurality of two-dimensional images to achieve a received selection; and
   dynamically generating and displaying, by said computer system and based on said accessed customer data, said accessed rules and said received selection, a recommendation of a personalized ensemble for said customer.

2. The computer-implemented method of claim 1, wherein said accessing, by said computer system, customer data further comprises:
   accessing said customer data, wherein at least a subset of said customer data is not required to be associated with said selection of one of said retail items for purchase.

3. The computer-implemented method of claim 1, wherein said accessing, by said computer system, customer data further comprises:
   accessing said customer data from a retailer.

4. The computer-implemented method of claim 1, wherein said accessing, by said computer system, customer data further comprises:
   accessing purchase history of said customer.

5. The computer-implemented method of claim 1, wherein said accessing, by said computer system, customer data further comprises:
   accessing social media information of said customer.

6. The computer-implemented method of claim 1, wherein said by said computer system, dynamically generating a recommendation of a personalized ensemble comprises:
   based on said accessed customer data, said accessed rules and said received selection, dynamically generating a recommendation of a personalized ensemble comprising coordinated items.

7. The computer-implemented method of claim 1, wherein said recommendation of said personalized ensemble is unique to said customer.

8. The computer-implemented method of claim 1, further comprising:
   generating, by said computer system, a correlation table based on said accessed customer data.

9. The computer-implemented method of claim 1, further comprising:
   based on said accessed customer data, said accessed rules and said received selection, by said computer system, dynamically generating, by said computer system, a hierarchy of recommendations.

10. The computer-implemented method of claim 1, further comprising:
    on said display screen and by said computer system, displaying, by said computer system, said recommendation in proximity to said selection of said one of said plurality of two-dimensional images.

11. A non-transitory computer-readable storage medium having instructions embodied therein when executed cause a computer system to perform a method for generating a recommendation of a personalized ensemble, said method comprising:
    accessing customer data associated with a customer to achieve accessed customer data;
    accessing rules, wherein said rules comprise a set of constraints pertaining to valid and invalid combinations of retail items, wherein said retail items have tags that describe respective retail items, and wherein said tags comprise subsets of tags;

determining, by said computer system, a quantity of two-dimensional images that can be displayed in a single view on a display of the computer system;

assigning the quantity of two-dimensional images as a predetermined threshold number;

reducing, by said computer system, said subsets of tags from a first number to said predetermined threshold number said first number of tags being a number of all tags fitting a particular descriptor, said reducing said subsets of tags to said predetermined threshold number by continuing to add additional descriptors to further narrow said first number of tags until less than said predetermined threshold number is reached;

displaying a plurality of two-dimensional images corresponding to said reduced subset of tags associated with said retail items;

receiving a selection of at least one of said plurality of two-dimensional images, wherein said plurality of two-dimensional images are scrollable around an outer surface of an unrendered three-dimensional sphere, said plurality of two-dimensional images concurrently rotatable in any direction about a center point of said sphere;

bookmarking said selection of at least one of said plurality of two-dimensional images respective a plurality of retail items; and dynamically generating and displaying a recommendation of a personalized ensemble for said customer based on said one or more bookmarked retail items and said accessed customer data.

12. The non-transitory computer-readable storage medium of claim 11, wherein said accessing customer data further comprises:

accessing said customer data, wherein at least a subset of said customer data is not required to be associated with said selection of one of said retail items for purchase.

13. The non-transitory computer-readable storage medium of claim 11, wherein said accessing customer data comprises:

accessing purchase history of said customer.

14. The non-transitory computer-readable storage medium of claim 11, wherein said accessing customer data comprises:

accessing social media information of said customer.

15. The non-transitory computer-readable storage medium of claim 11, wherein said recommendation of a personalized ensemble is unique to said customer.

16. The non-transitory computer-readable storage medium of claim 11, further comprising:

displaying said recommendation of said personalized ensemble.

17. The non-transitory computer-readable storage medium of claim 11, further comprising:

displaying said selected bookmarked item in a filmstrip format.

* * * * *